(12) United States Patent
Wang et al.

(10) Patent No.: US 12,436,092 B1
(45) Date of Patent: Oct. 7, 2025

(54) CONTINUOUS LINE FOR AUTOMATIC DIAMOND COLOR GRADING EVALUATION

(71) Applicant: Hong Kong Applied Science and Technology Research Institute Company Limited, Hong Kong (HK)

(72) Inventors: Yuelin Wang, Hong Kong (HK); Ziqi Wang, Hong Kong (HK); Chun Zhang, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 0 days.

(21) Appl. No.: 18/911,583

(22) Filed: Oct. 10, 2024

(51) Int. Cl.
| | |
|---|---|
| *G01N 21/25* | (2006.01) |
| *B07C 5/342* | (2006.01) |
| *G01N 33/00* | (2006.01) |
| *G01N 35/00* | (2006.01) |
| *G01N 35/04* | (2006.01) |

(Continued)

(52) U.S. Cl.
CPC ......... *G01N 21/251* (2013.01); *B07C 5/3422* (2013.01); *G01N 33/389* (2024.05); *G01N 35/0099* (2013.01); *G01N 35/04* (2013.01); *G06T 7/0002* (2013.01); *G06T 7/90* (2017.01); *B07C 2501/0063* (2013.01); *G06T 2207/10024* (2013.01); *G06T 2207/30181* (2013.01)

(58) Field of Classification Search
CPC ...... G01N 21/251; G01N 33/389; G06T 7/90; B07C 5/3422
See application file for complete search history.

(56) References Cited

U.S. PATENT DOCUMENTS

| | | |
|---|---|---|
| 11,435,296 B2 | 9/2022 | Leizerson |
| 11,892,412 B2 | 2/2024 | Zvi et al. |
| 2010/0111354 A1 | 5/2010 | Hornabrook et al. |

(Continued)

FOREIGN PATENT DOCUMENTS

| | | |
|---|---|---|
| CN | 102596433 A | 7/2012 |
| CN | 106679811 A | 5/2017 |

(Continued)

OTHER PUBLICATIONS

ISR and Written Opinion, PCT/CN2024/125519, Jun. 30, 2025.
Imagen, "Varna-D", data sheet, 2024.
OGI Systems, Ltd., "DiaColor OGI Colorimeter", data sheet, 2019.

*Primary Examiner* — Michael McCullough
*Assistant Examiner* — Jessica L Burkman
(74) *Attorney, Agent, or Firm* — Stuart T. Auvinen; gPatent LLC

(57) ABSTRACT

An automated diamond color-grading machine color grades a continuous line of diamonds without human color evaluation. A sample diamond is carried by an input conveyor and placed on a mount on a rotating plate by a robotic arm. The rotating plate has Nm mounts with Nr master stones of known color grades and Ns sample diamonds. A camera takes a photo of the rotating plate with all diamonds and then a step motor rotates the plate by 360/Nm degrees and another photo captured. This is repeated Nm times so that the sample diamond and all master stones are each imaged in all Nm possible rotational positions. Pixels are averaged over all positions for each diamond to get an average x,y value for each diamond. The color grade of the sample diamond is the master stone with the closest less-color x,y average.

20 Claims, 28 Drawing Sheets

(51) Int. Cl.
    *G06T 7/00*         (2017.01)
    *G06T 7/90*         (2017.01)

(56) References Cited

U.S. PATENT DOCUMENTS

| | | | |
|---|---|---|---|
| 2011/0228063 A1* | 9/2011 | Smith | G01N 21/87 356/30 |
| 2012/0007971 A1 | 1/2012 | Schnitzer et al. | |
| 2021/0131974 A1 | 5/2021 | Ioffe et al. | |
| 2022/0146433 A1 | 5/2022 | Ioffe et al. | |

FOREIGN PATENT DOCUMENTS

| | | |
|---|---|---|
| CN | 106840404 A | 6/2017 |
| CN | 106840404 B | 5/2018 |
| CN | 108027328 A | 5/2018 |
| CN | 112381833 A | 2/2021 |
| CN | 109991230 B | 2/2022 |
| CN | 115769066 A | 3/2023 |
| CN | 110132972 B | 6/2023 |
| WO | WO2008119125 A | 10/2008 |

\* cited by examiner

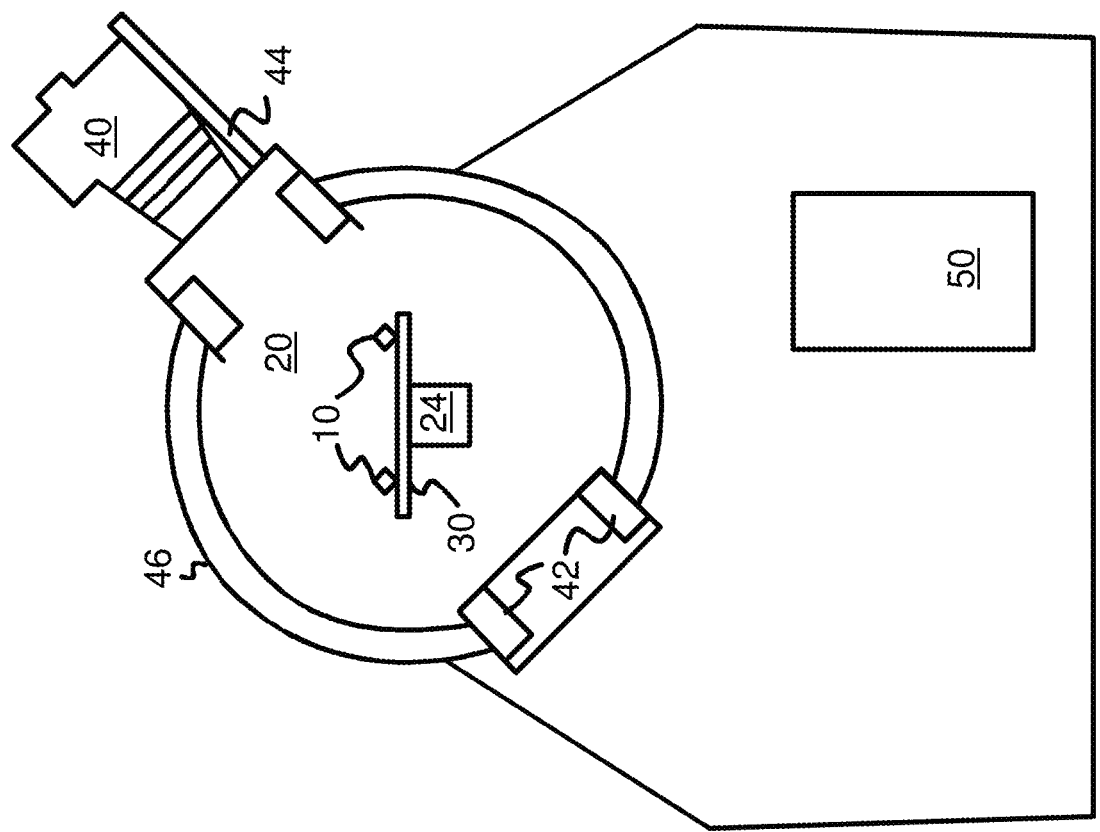

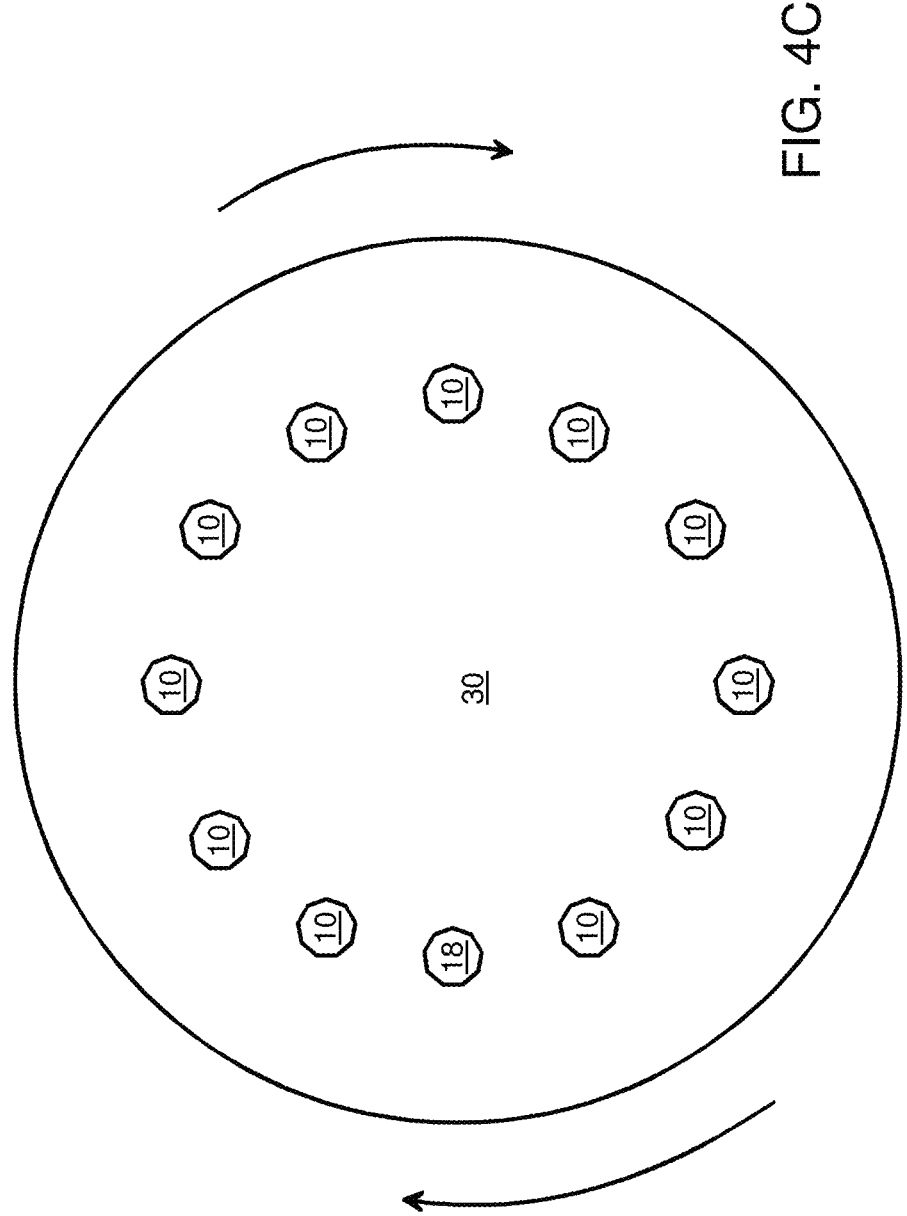

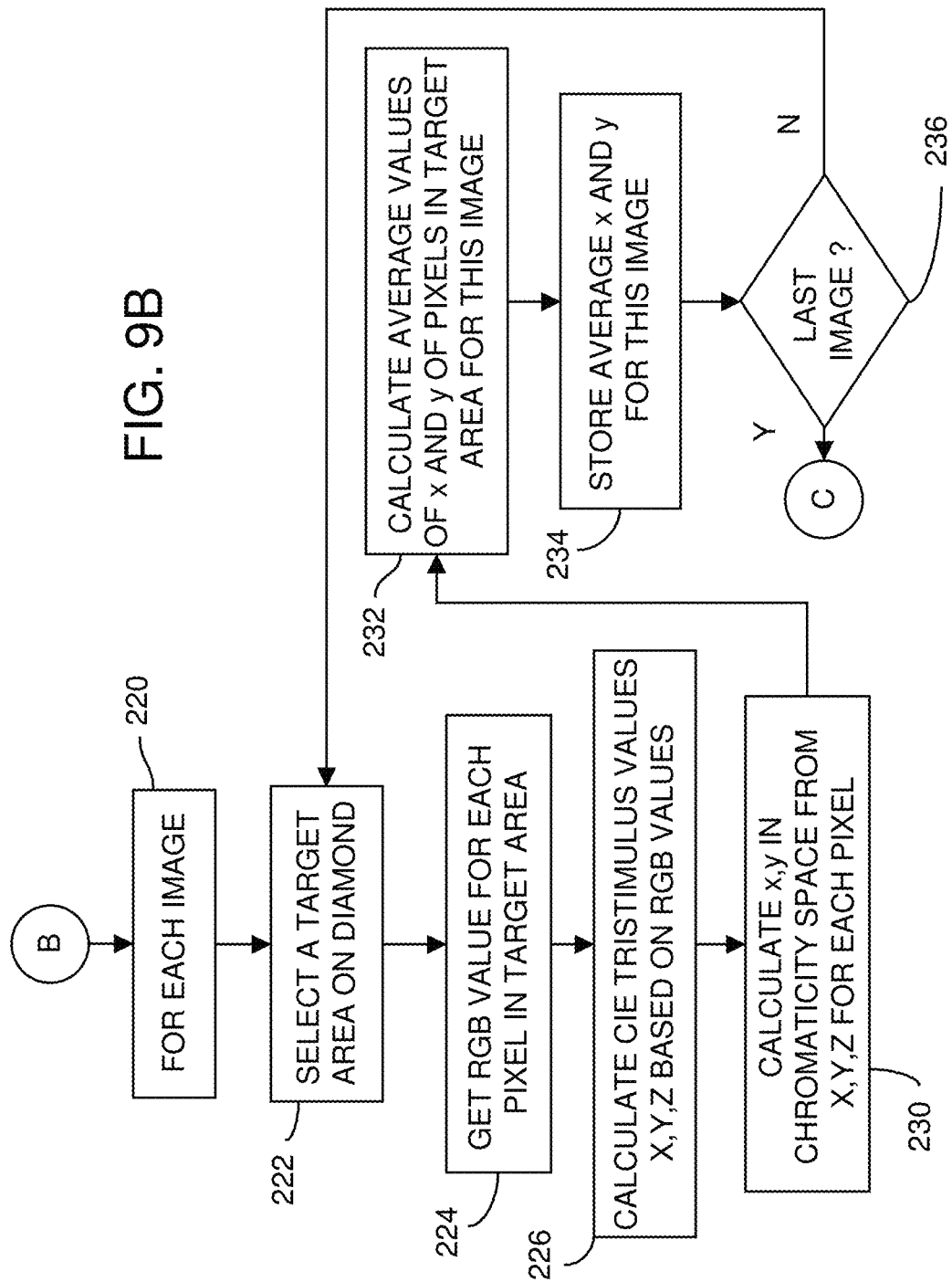

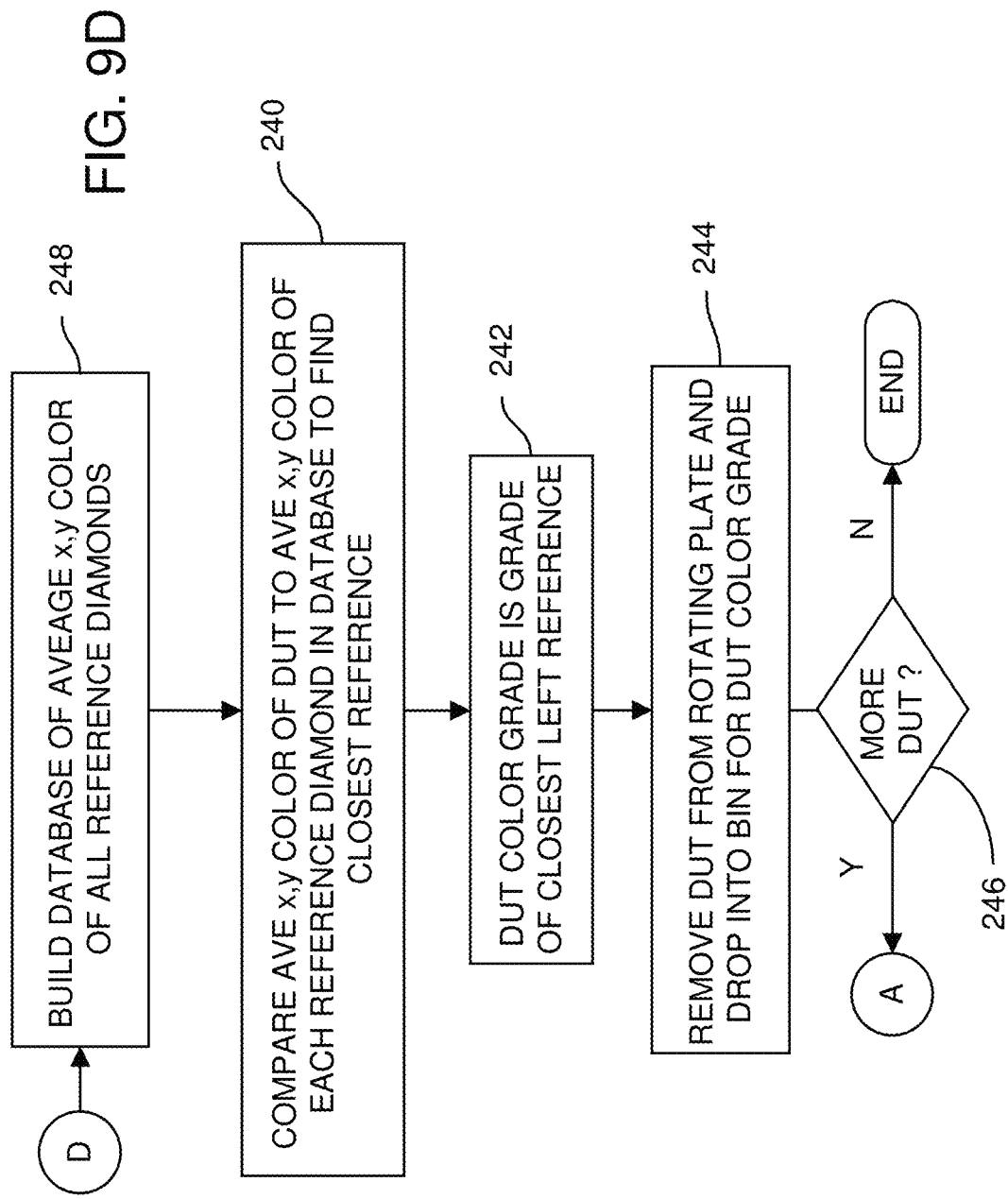

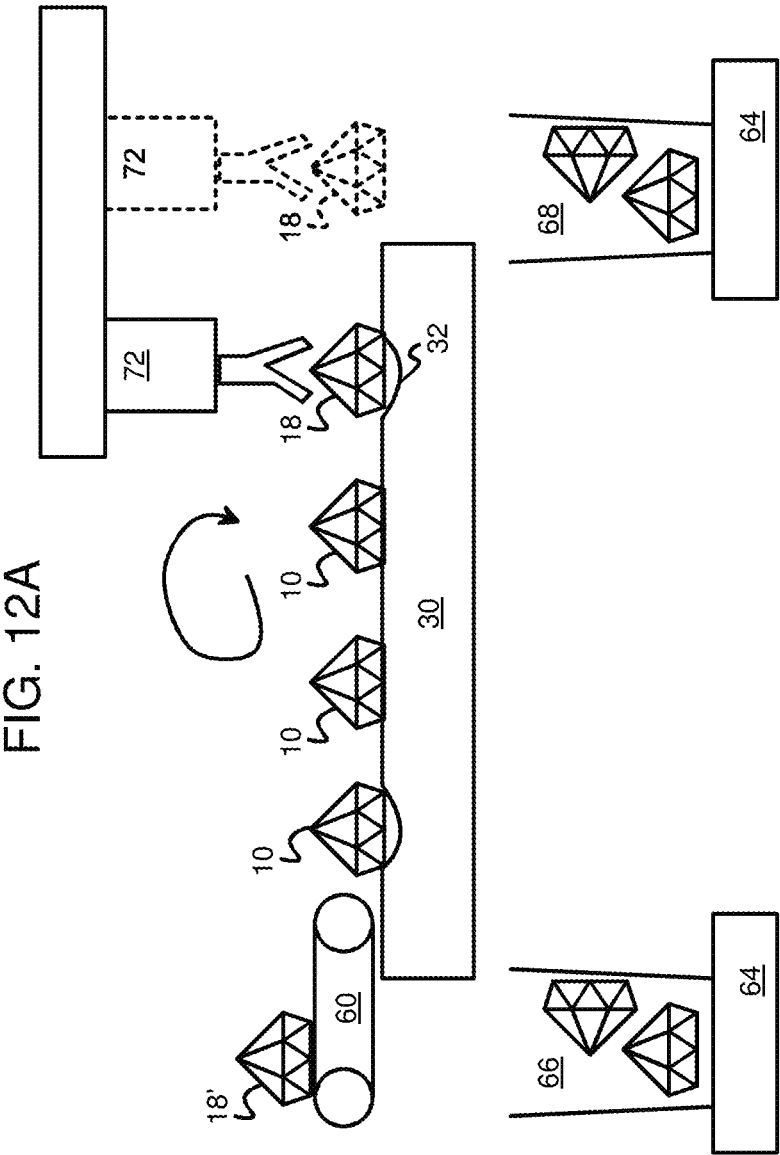

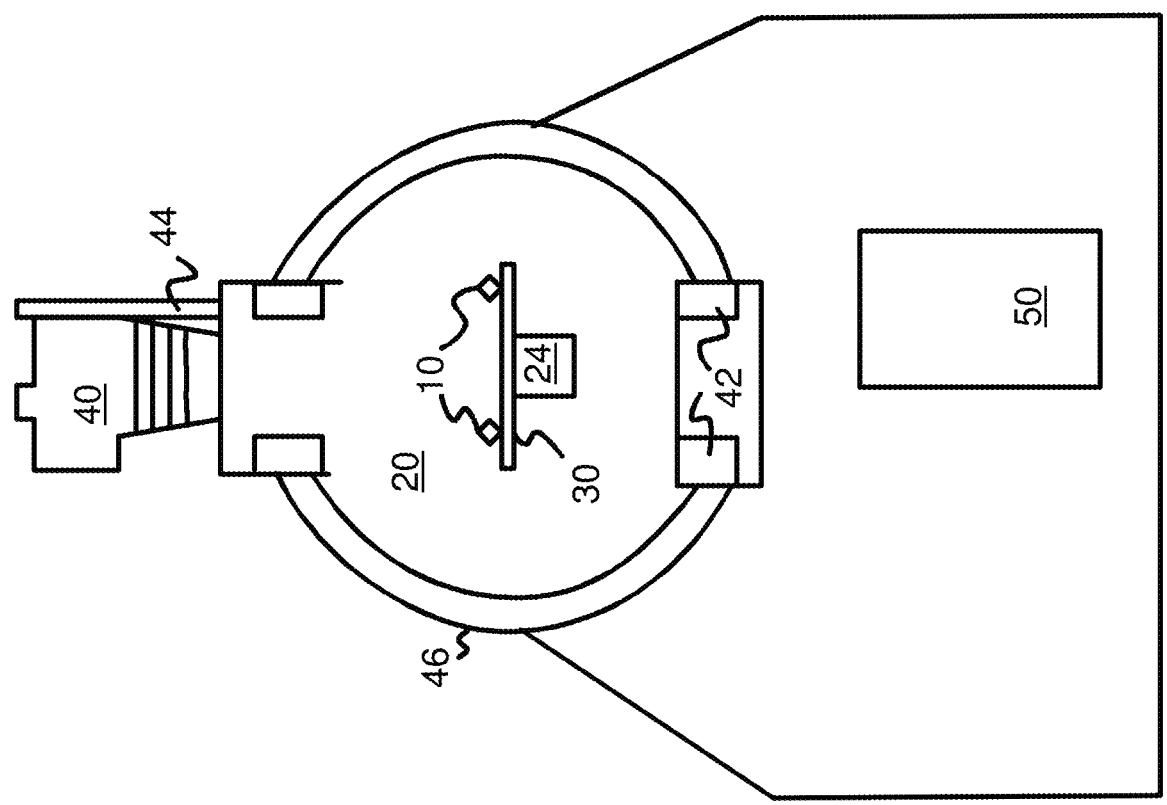

CONTINUOUS LINE FOR AUTOMATIC DIAMOND COLOR GRADING EVALUATION

FIELD OF THE INVENTION

This invention relates to automated inspection machines, and more particularly to automatic color grading of diamonds.

BACKGROUND OF THE INVENTION

Diamonds have long been one of the most sought-after of all the precious stones. Wide availability despite their relative scarcity boosts consumer demand. Pricing and value can vary widely due to variations of each individual diamond.

The quality of a diamond is based on the 4 C's: Color, Clarity, Cut, and Carat weight. Clear diamonds are worth more than faint yellow diamonds, which are worth more than light colored diamonds that have more than a faint color. Typically a person with specialized training and years of experience will compare a diamond under evaluation to a series of diamond master stones of different known color grades.

FIG. 1 shows color grades of diamonds. A colorless diamond with a D grade is the most valuable while a light colored diamond with a Z grade or past the Z grade (>Z) are the least valuable, based on color alone. Grades D, E, and F are colorless, grades G, H, I, J are near colorless, while grades K, L, M have greater degrees of faint color. Grades N through R have increasing levels of light color, while lightly colored diamonds are graded S to Z.

Since its introduction in the early 1950s, the Gemological Institute of America (GIA)'s D-to-Z scale has been used to color grade the overwhelming majority of colorless to light yellow gem-quality polished diamonds on which laboratory reports have been issued. D-to-Z color grading is based on the observations of a trained observer, who compares a diamond being evaluated to color master stones of known position on the grading scale. GIA master stones are located at the highest point in their respective grade range. A diamond equal to the G master is graded a G. If it has slightly less color, it would receive a grade of F.

Typically, a trained person will line up the known master stones in a line on a dull white background table under a light source with a color temperature of 5500-6500K. The diamond under evaluation and the master stones are all examined at a 45 degree angle while the stones are aligned directly under the light source. The sample diamond under evaluation is usually examined in several different directions.

Color can be evaluated qualitatively by a person. However, color can also be defined by a color space, such as the International Commission on Illumination (CIE) RGB XYZ, xy, or Lightness, Aperture, Brightness (LAB) color spaces. Colors can be represented by two or three digital values in the color space. For instance, the chromaticity in the CIE XYZ color space is specified by the two derived parameters x and y, two of the three normalized values being functions of all three tristimulus values X, Y, and Z. The CIE xy chromaticity diagram displays the maximally saturated bright colors. Machines can detect color and report the digital values in the selected color space.

FIG. 2 shows a series of diamond master stones evaluated in a CIE 1931 color space chromaticity diagram. The CIE 1931 color space represents a color by x, y values between 0 and 1, when normalized. The same 10 master stones are evaluated by a color-detection machine during a trail that is repeated 3 times.

In first trial 12, master stone D has the lowest x,y value and master stone M has the highest x,y value. Master stones E though K have successively higher x,y values, but then stone L has a lower x,y value than the x,y value for stone K, even though master stone K should have a lower x,y value than master stone L. This regression of the x,y value for master stone L of trial 12 is clearly in error.

In second trail 14, master stones D and E have about the same x,y values, even though master stone D should have a lower x,y value. Master stones F and G are too close to each other and should have x,y values that differ from each other by a greater amount.

In third trial 16, master stones D and E have almost the same x,y values, but they should differ. Master stones L and M also have nearly the same x,y values, but should differ.

Although the same 10 master stones were evaluated in trials 12, 14, 16, there is an offset for each trail. Trail 12 has most stones x,y value shifted down and to the left relative to the x,y values for trial 14. The x,y values for third trial 16 is shifted up (higher y values) and to the right (higher x values) relative to trials 12, 14.

The amount of x and y shifts are small, roughly 0.001 in x and 0.002 in y, or about 0.3%. However, the distance between color grades of the master stones is even smaller, being about 0.0004 in x and 0.0003 in y. A much more precise system is needed to evaluate sample diamonds to within 0.5 of a color grade. While offsets in x,y may be tolerated for different trials, the master stones should have steadily increasing x,y values for successive master stones. No regressions should occur.

More recently, automated diamond color grading machines are becoming available. Some may use a manually rotated platform that can be slow and difficult to use. These machine may be expensive or have poor accuracy.

It is desired to automatically color grade diamonds to within +/−0.5 color grade. An automated process and machine to evaluate the color grade of sample diamonds is desirable. A machine that feeds a continuous line of sample diamonds for comparison to known master stones is desirable for automated diamond color grading.

BRIEF DESCRIPTION OF THE DRAWINGS

FIG. 3 is a diagram of a diamond color grading machine.

FIGS. 4A-4C show the rotating plate in more detail.

FIGS. 9A-9D show a flowchart of operation of the diamond color-grading machine.

FIGS. 12A-12B show a side view of an alternative diamond color grading machine with an annular output sorter.

FIG. 15 is an alternative diamond color grading machine with the camera directly over the rotating plate of diamonds.

DETAILED DESCRIPTION

Figure 1:
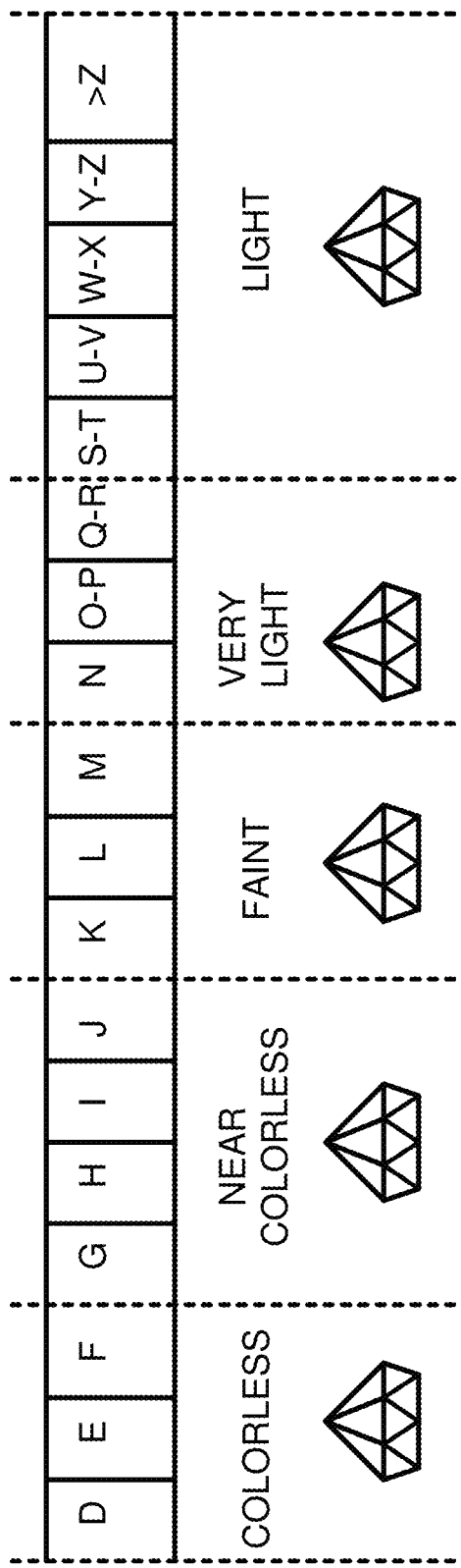
FIG. 1 shows color grades of diamonds.
Figure 2:
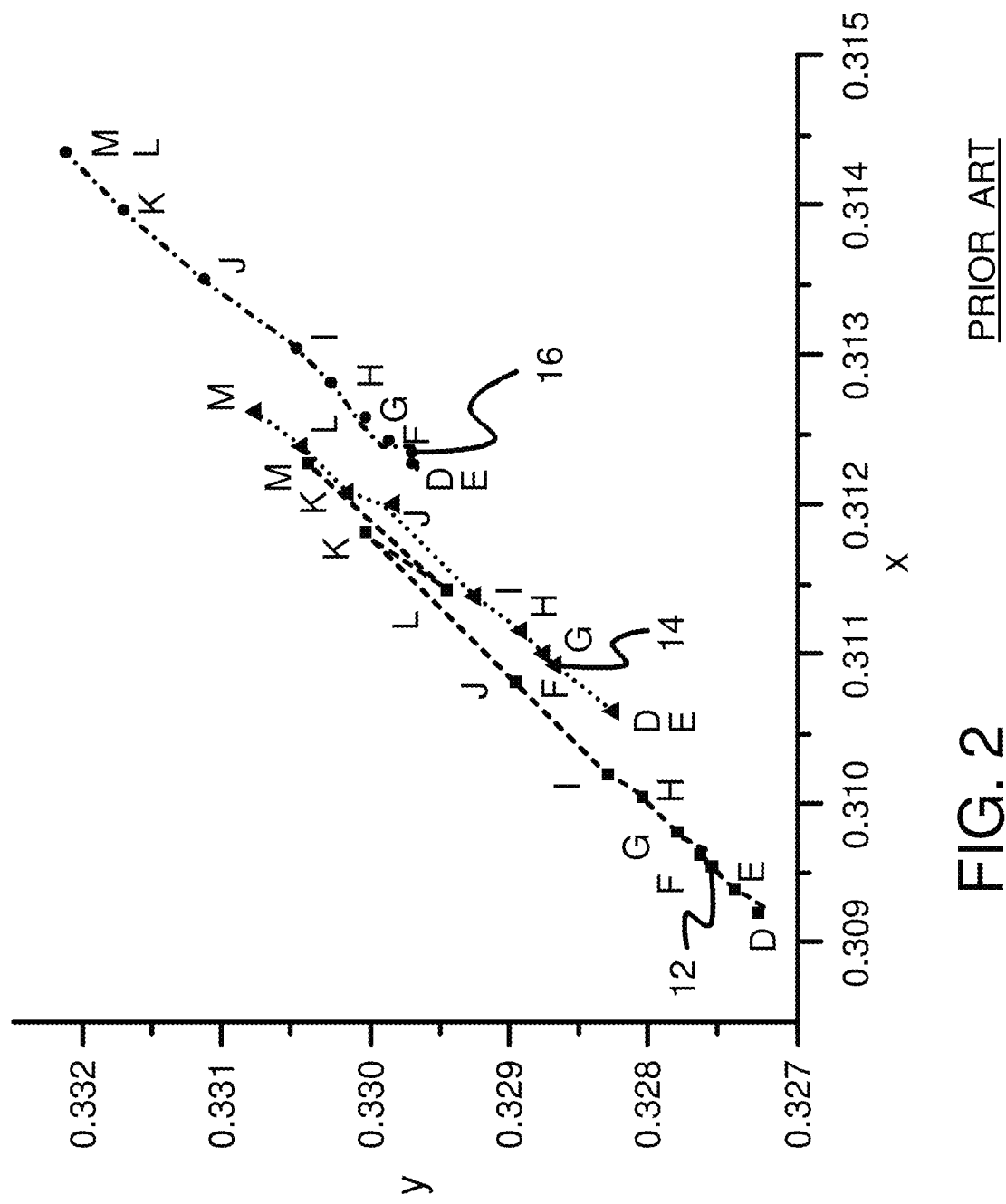
FIG. 2 shows a prior-art series of diamond master stones evaluated in a CIE 1931 color space chromaticity diagram.

The present invention relates to an improvement in diamond color grading. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

FIG. 3 is a diagram of a diamond color grading machine. A batch of sample diamonds can be input to the diamond color grading machine, which has a conveyer or robotic arm system (not shown) to continuously feed the sample diamonds and place a sample diamond on rotating plate 30 for comparison to a set of master stones 10 that are also placed on rotating plate 30. Step motor 24 rotates rotating plate 30 to allow a new sample diamond to be placed on rotating plate 30 and to remove sample diamonds that have finished evaluation.

Light source 42 under rotating plate 30 provides a uniform white light that illuminates master stones 10 and the sample diamond on rotating plate 30. Shell 46 can be a sphere with its interior having a flat white surface to diffuse light from light source 42 within chamber 20 and provide a dull white background. The top surface of rotating plate 30 can likewise have a dull white color surface.

Camera 40 is mounted on bracket 44 to shell 46. An opening in shell 46 allows the lens of camera 40 to capture an image of light reflected off the sample diamond and master stones 10 on rotating plate 30. Controller or computer 50 can cause camera 40 to capture images after computer 50 causes step motor 24 to rotate rotating plate 30 a desired amount. The images captured by camera 40 can be analyzed by computer 50 or sent to a different computer or server for more intense processing.

Figure 4A:
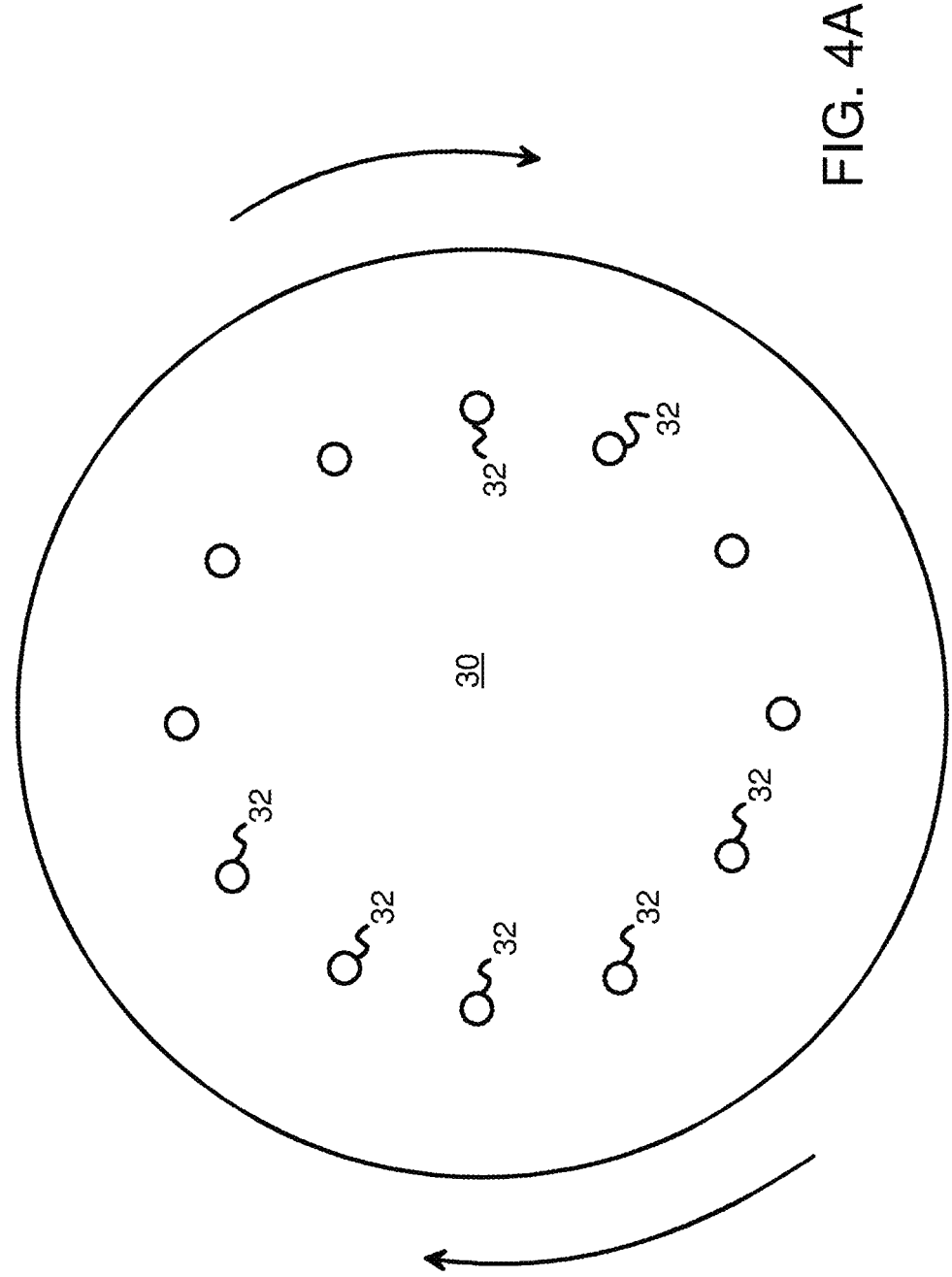
Figure 4B:
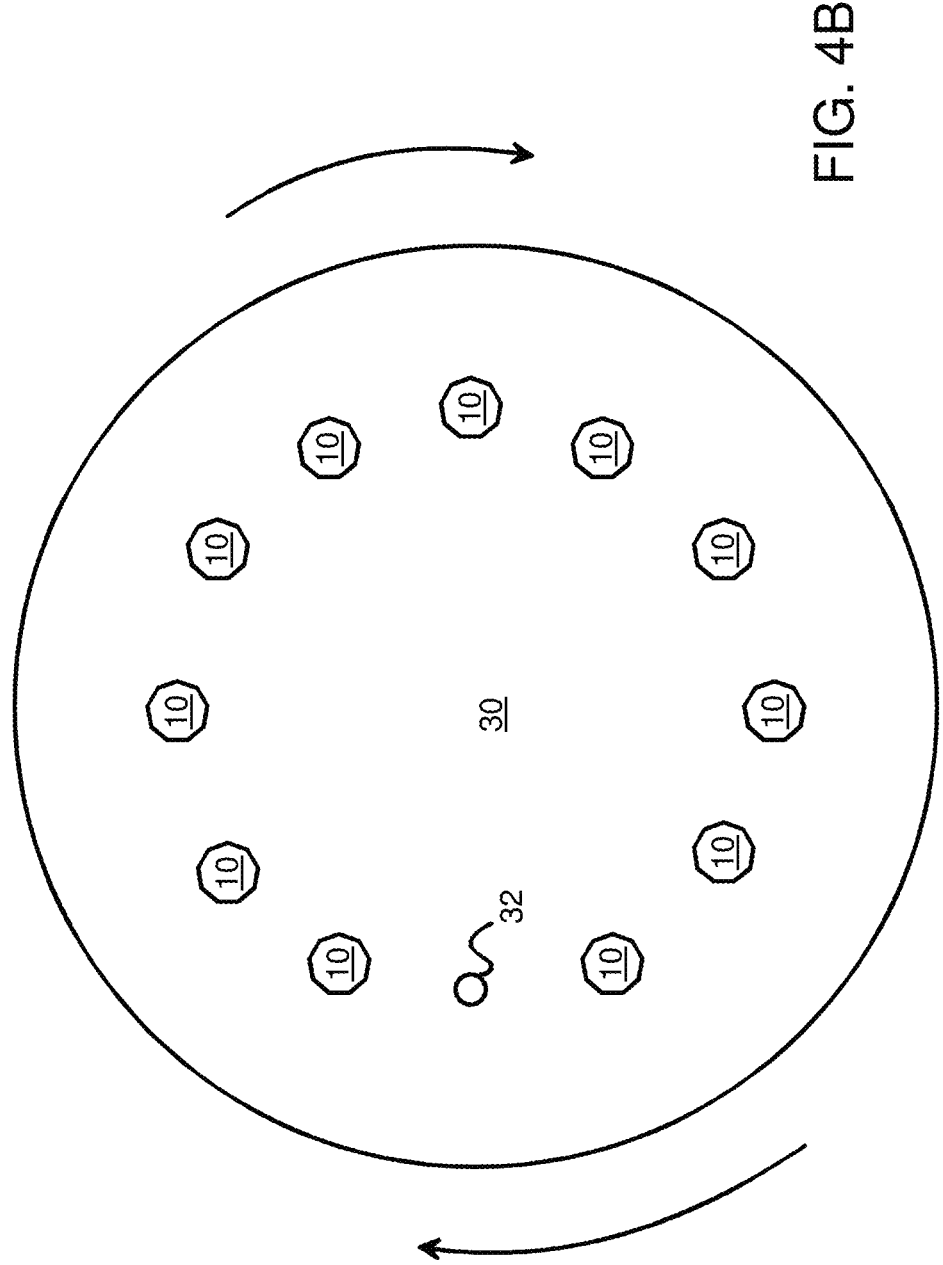

FIGS. 4A-4C show the rotating plate in more detail. In FIG. 4A, rotating plate 30 is empty with no diamonds loaded upon it. There are several mounts 32 that are arranged around rotating plate 30. Each mount 32 can be a dip or depression in rotating plate 30 that a diamond can be placed into by a conveyor or robotic arm. Mount 32 can also be a raised mount or clip that is attached to the surface of rotating plate 30 that can hold a diamond in place as rotating plate 30 rotates.

In FIG. 4B, master stones 10 have been placed in mounts 32. However, one mount 32 remains vacant. In this example, 11 master stones 10 have been placed on rotating plate 30.

In FIG. 4C, sample diamond 18 has been placed in the one vacant mount 32. All mounts 32 are occupied by either sample diamond 18 or master stones 10. Each of master stones 10 has a different color grade.

For a set of 11 master stones 10 and one sample diamond, a total of 12 mounts 32 are placed on rotating plate 30, each separated by a radial angle of 30 degrees (360/12). Computer 50 instructs step motor 24 to rotate rotating plate 30 by 30 degrees, then instructs camera 40 to capture a photo of rotating plate 30 and the sample diamond and master stones 10 on it. Then computer 50 instructs step motor 24 to rotate by another 30 degrees, and another photo captured. This is repeated for a total of 12 photos and 12 rotations for a total of 360 degrees.

Figure 5:
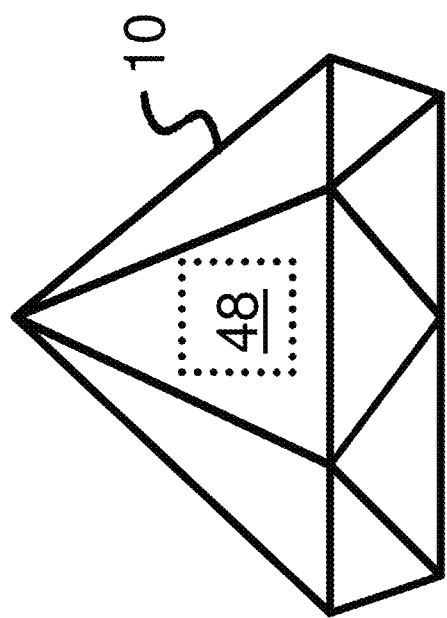
FIG. 5 shows a target area on an image of a diamond.

FIG. 5 shows a target area on an image of a diamond. Camera 40 captures a photo of all master stones 10 and sample diamond 18 on rotating plate 30 for each rotation of step motor 24. Computer 50 detects portions of the photo containing a diamond and separates the photo into 12 images, with one diamond per image. Then computer 50 can further process each single-diamond image to select target area 48 on master stone 10 or on sample diamond 18.

Target area 48 can be within one of the facets or faces of the diamond, or can include more than one face and include one or more edges of the diamond. Computer 50 can select target area 48 as an area with a consistent color and without abrupt color changes, or can simply define a boundary of the diamond and select target area 48 as an area within the defined boundary.

Figure 6A:
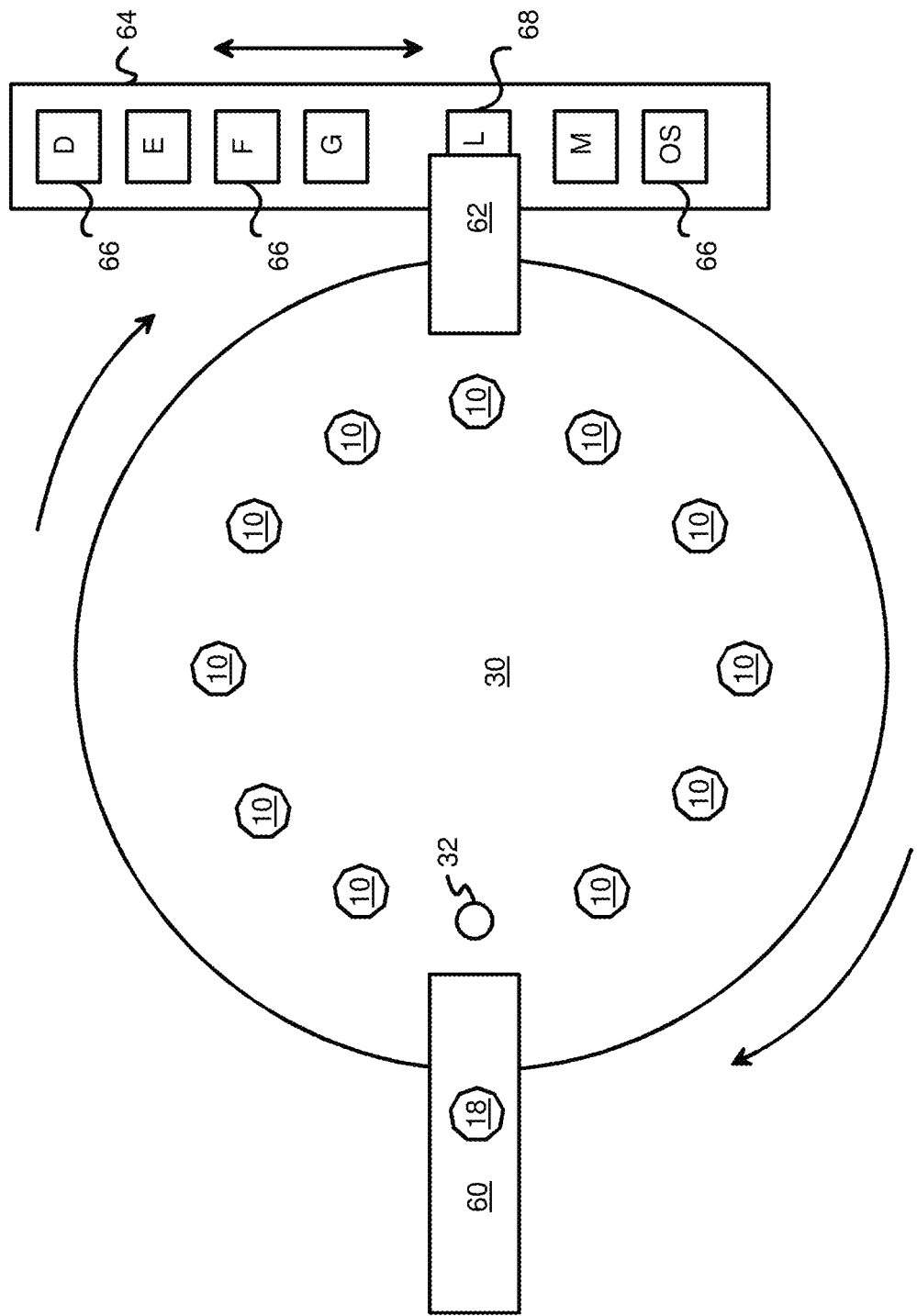
FIG. 6A-6D show a conveyor system loading and unloading a sample diamond on the rotating plate.

FIGS. 6A-6D show a conveyor system loading and unloading a sample diamond on the rotating plate. In FIG. 6A, rotating plate 30 has been pre-loaded with 11 master stones 10 and has one vacant mount 32. Computer 50 has instructed step motor 24 (not shown) to rotate rotating plate 30 so that vacant mount 32 is aligned with input conveyor 60. Sample diamond 18 is moved along by input conveyor 60 until the end of input conveyor 60 is reached, when sample diamond 18 drops into mount 32. Mount 32 can have a narrowing shape to guide sample diamond 18 into position as sample diamond 18 falls from input conveyor 60.

Figure 6B:
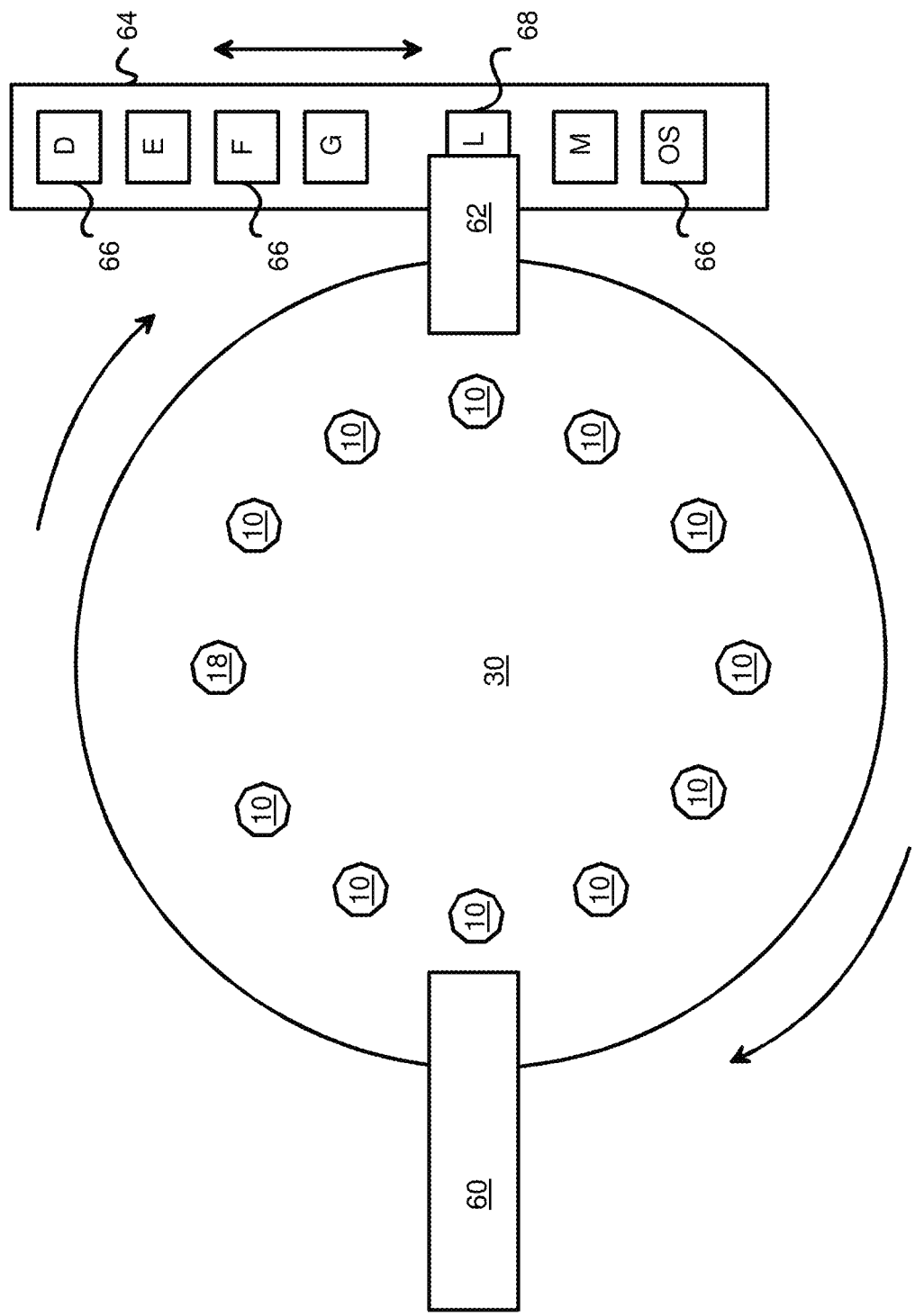

In FIG. 6B, rotating plate 30 has been rotated three times, for a total of 90 degrees, so that sample diamond 18 is at the top of FIG. 6B. Camera 40 has captured three photos, one for each step rotation of rotating plate 30.

Figure 6C:
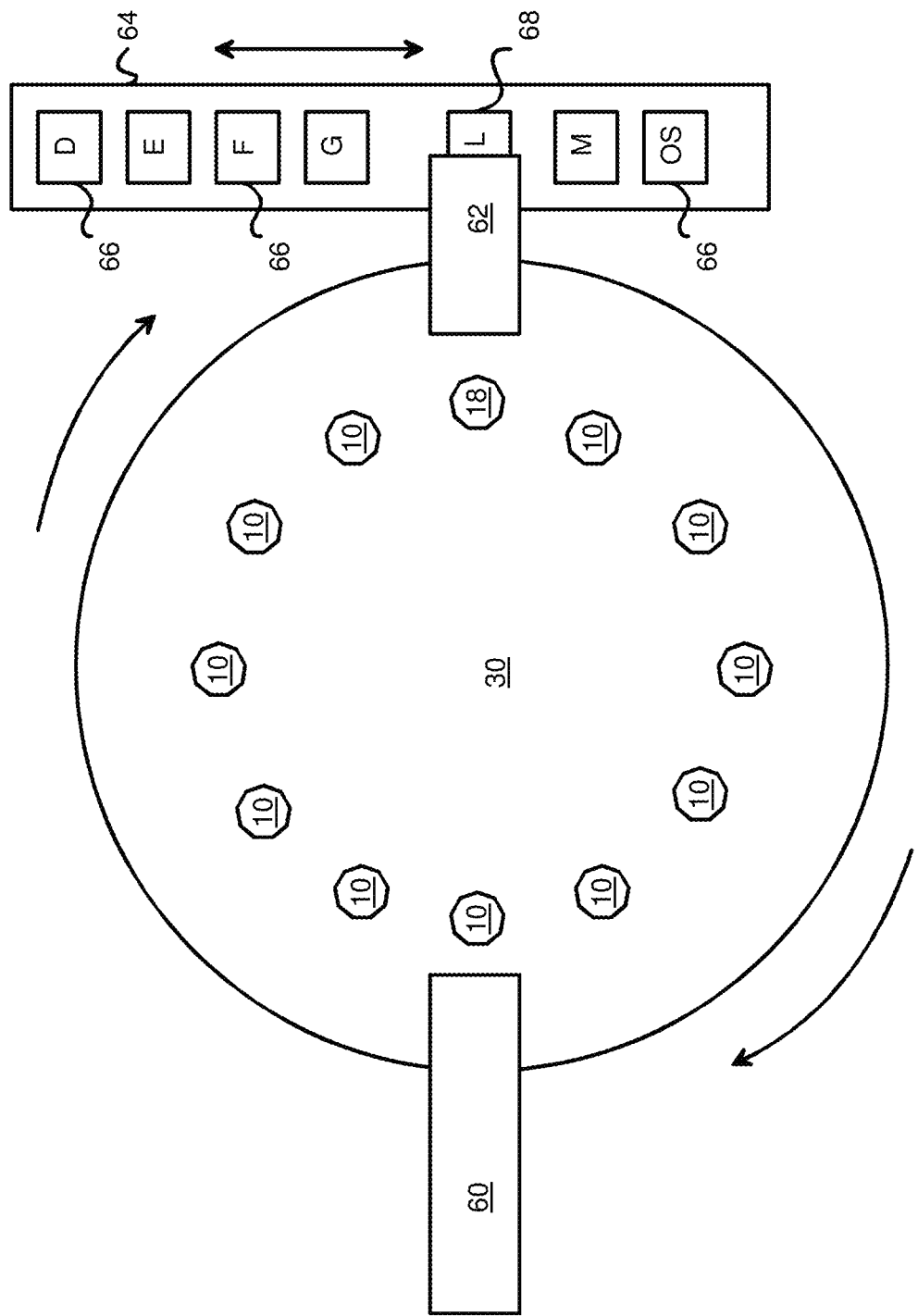

In FIG. 6C, rotating plate 30 has been rotated six times, for a total of 180 degrees, so that sample diamond 18 is at the right of FIG. 6C. Camera 40 has captured six photos, one for each step rotation of rotating plate 30.

Computer 50 then continues stepping rotating plate 30 until sample diamond 18 returns to the initial position under input conveyor 60. A total of 12 photos have been captured for the 12 step rotations of rotating plate 30. Finally, computer 50 causes step motor 24 to rotate rotating plate 30 by 180 degrees so that sample diamond 18 is placed under output conveyor 62.

Figure 6D:
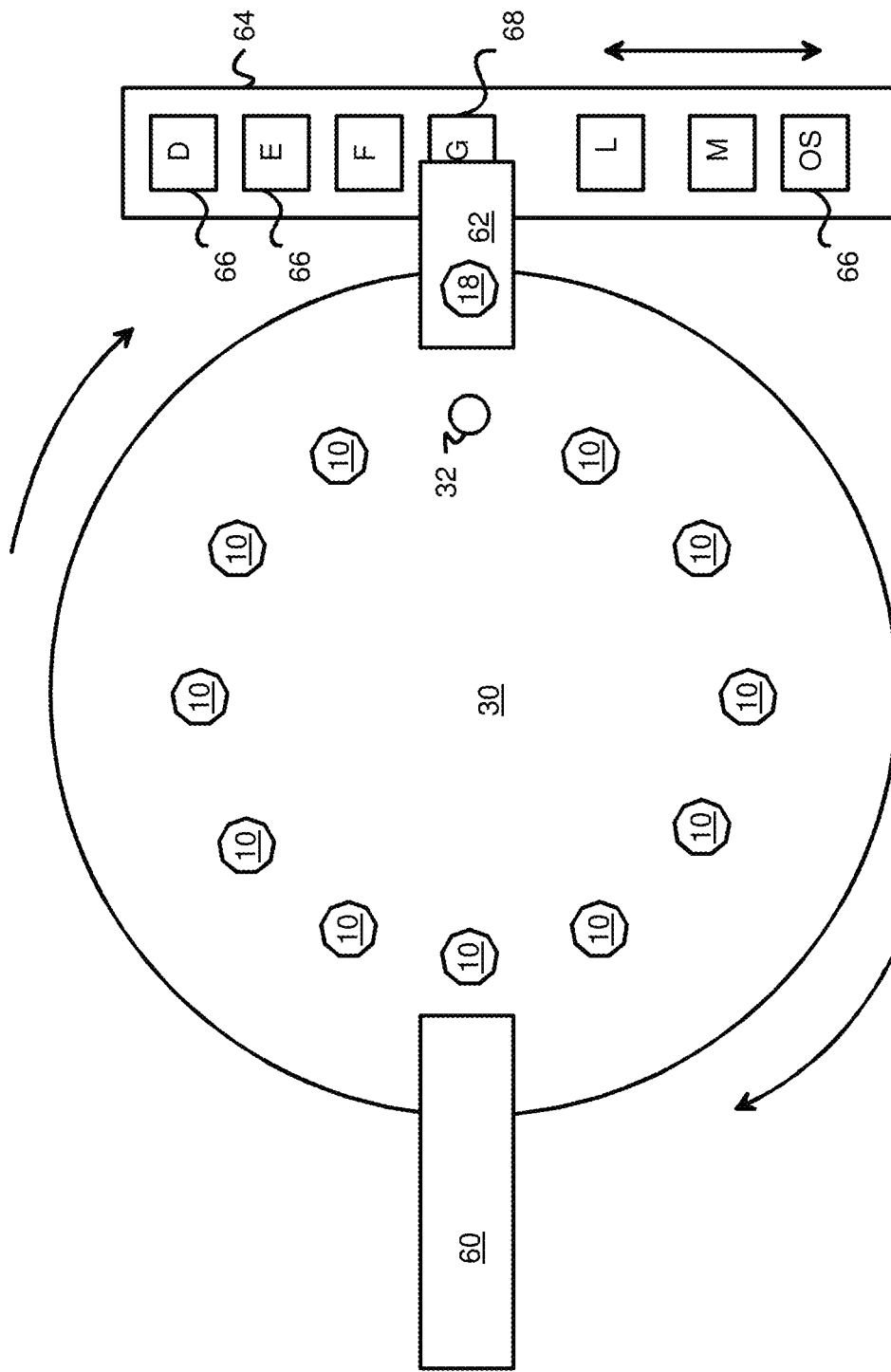

In FIG. 6D, sample diamond 18 has been removed from mount 32 and placed on output conveyor 62. A robotic arm (not shown) can pick up sample diamond 18 from rotating plate 30 and place sample diamond 18 on output conveyor 62.

Output sorter 64 has several bins 66, each for a different color grade of sample diamond 18. When computer 50 determines the color grade of sample diamond 18, then computer 50 commands output sorter 64 to move bins 66 so that target bin 68 for the determined color grade is below the end of output conveyor 62. Then sample diamond 18 falls into target bin 68.

Figure 7A:
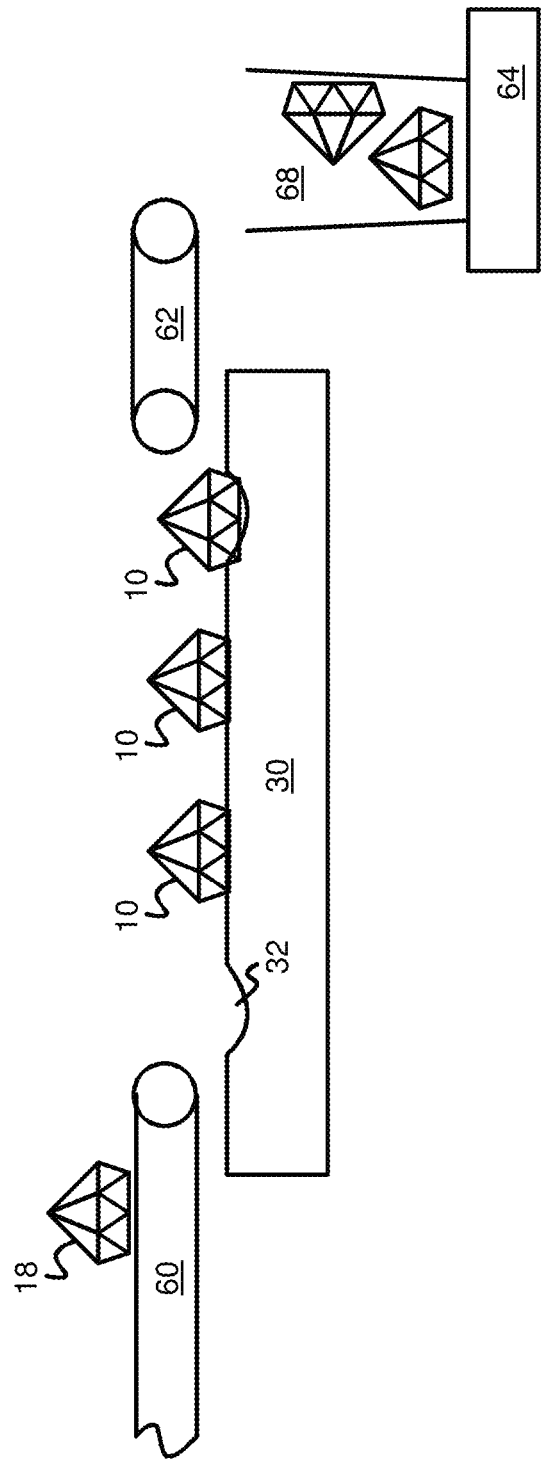
FIGS. 7A-7E show a side view of the conveyor system loading and unloading a sample diamond onto the rotating plate.

FIGS. 7A-7E show a side view of the conveyor system loading and unloading a sample diamond onto the rotating plate. In FIG. 7A, rotating plate 30 has been pre-loaded with master stones 10 and has one vacant mount 32. Computer 50 has instructed step motor 24 (not shown) to rotate rotating plate 30 so that vacant mount 32 is aligned with input conveyor 60. Sample diamond 18 is moved along by input conveyor 60 until the end of input conveyor 60 is reached, when sample diamond 18 drops into mount 32. Mount 32 can have a narrowing shape to guide sample diamond 18 into position as sample diamond 18 falls from input conveyor 60.

Figure 7B:
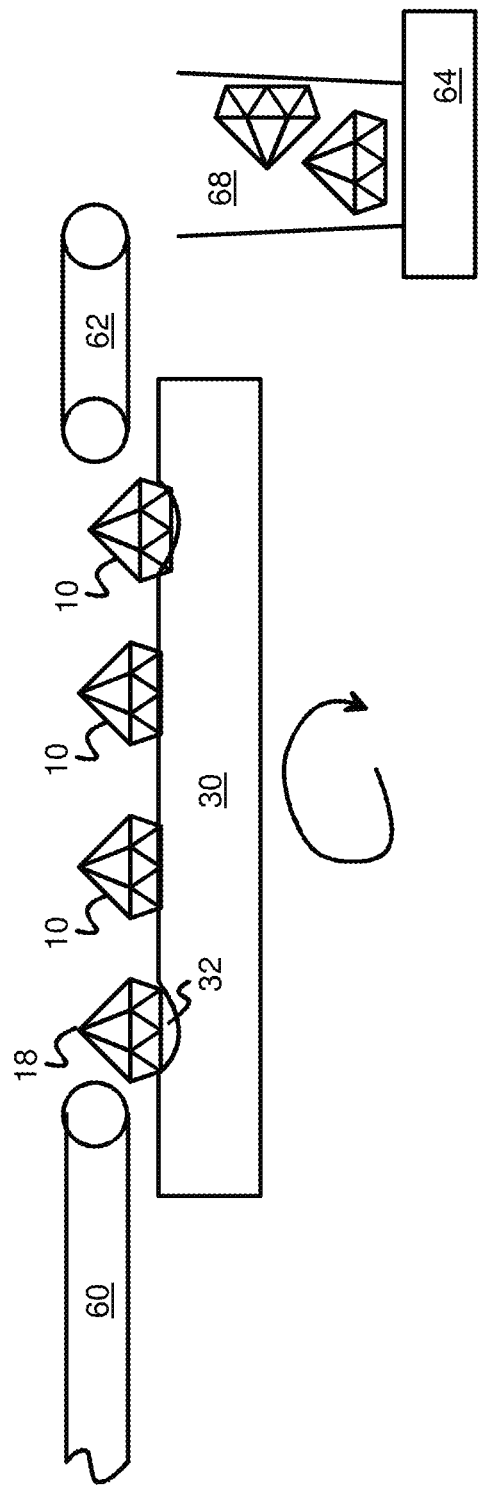

In FIG. 7B, input conveyor 60 has dropped sample diamond 18 into mount 32. rotating plate 30 is now fully loaded with master stones 10 and sample diamond 18. Camera 40 takes one photo per radial step of step motor 24, for a total of Nt rotations and Nt photos. Nt=Ns+Nr, wherein Ns is the number of sample diamond 18 on rotating plate 30 and Nr is the number of master stones 10 on rotating plate 30.

Figure 7C:
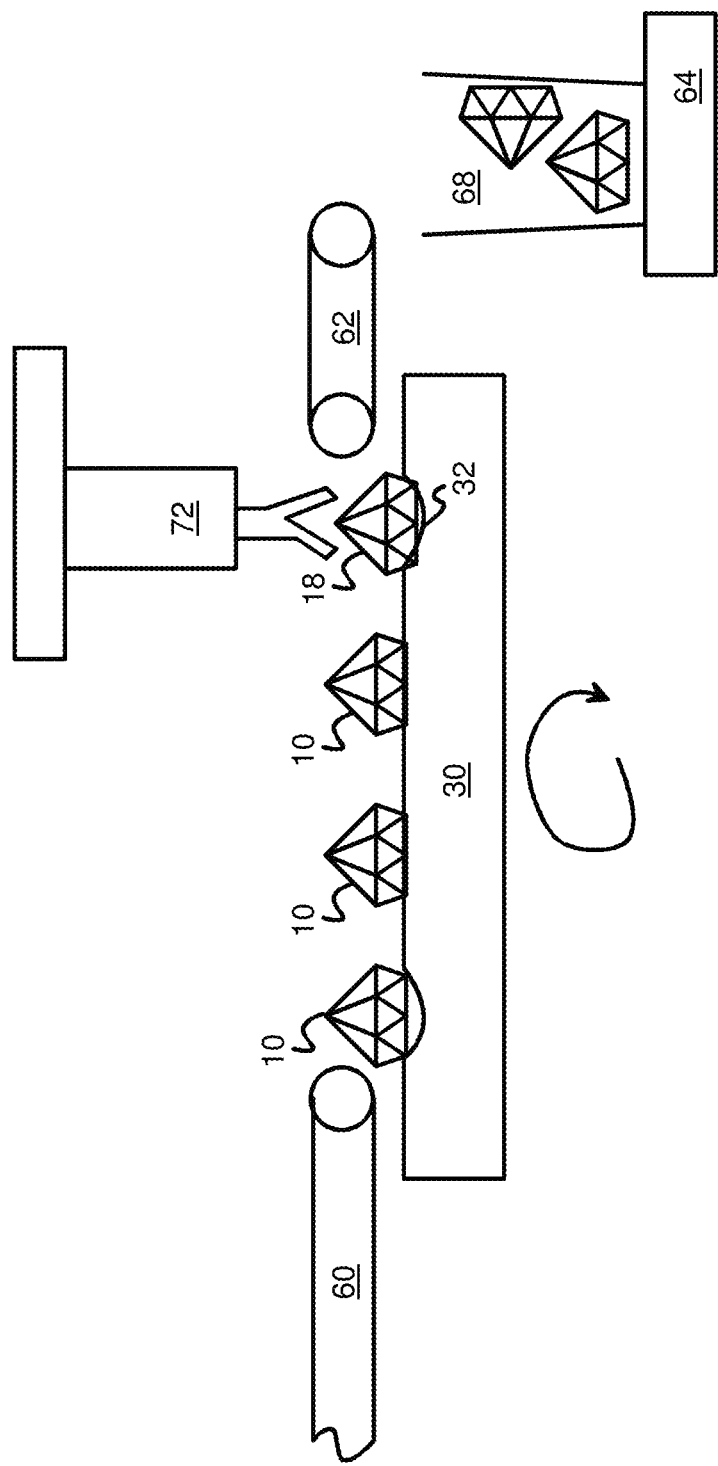

In FIG. 7C, after the Nt radial steps of step motor 24, computer 50 determines the color grade of sample diamond 18. Computer 50 instructs output sorter 64 to shift bins 66 so that target bin 68 for the color grade determined by computer 50 is aligned under the end of output conveyor 62.

Figure 7D:
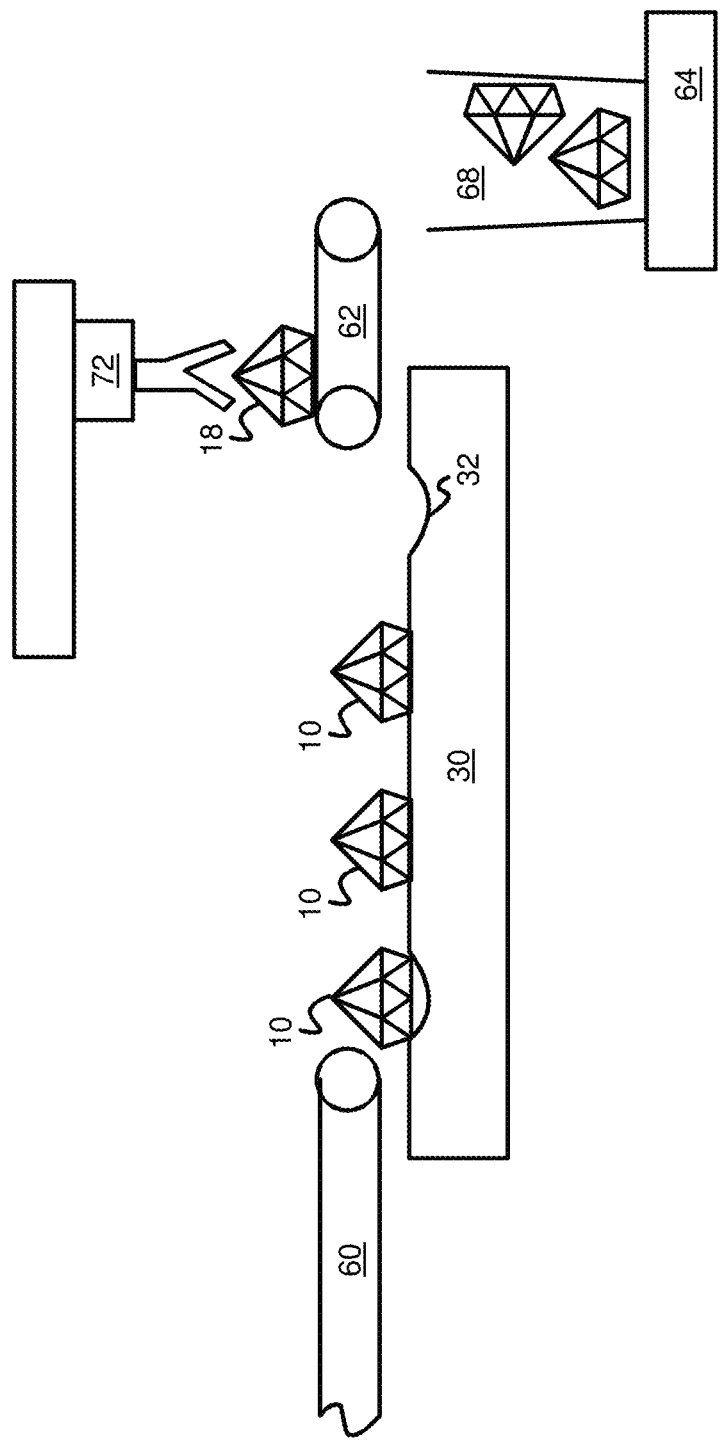

Computer 50 also activated step motor 24 to rotate rotating plate 30 by 180 degrees so that sample diamond 18 is aligned with output conveyor 62. Then computer 50 commands robotic arm 72 to pick up sample diamond 18 out of mount 32 on rotating plate 30. In FIG. 7D, robotic arm 72 has been commanded by computer 50 to move sample diamond 18 over to output conveyor 62 and place sample diamond 18 onto output conveyor 62.

Figure 7E:
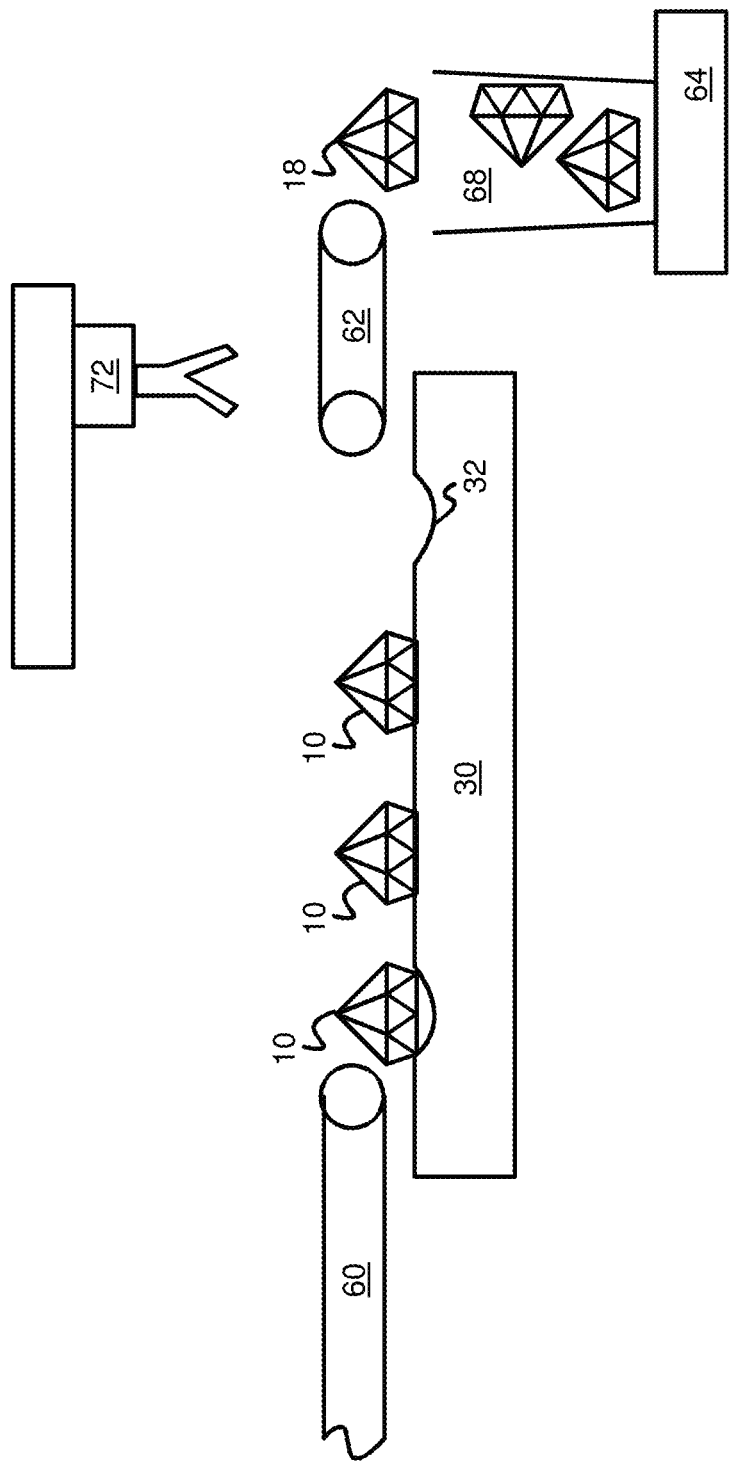

In FIG. 7E, sample diamond 18 reaches the end of output conveyor 62 and sample diamond 18 falls into target bin 68 that was moved into position under the end of output conveyor 62 by output sorter 64. Target bin 68 may contain other sample diamonds 18 that have the same color grade, such as G.

Figure 8:
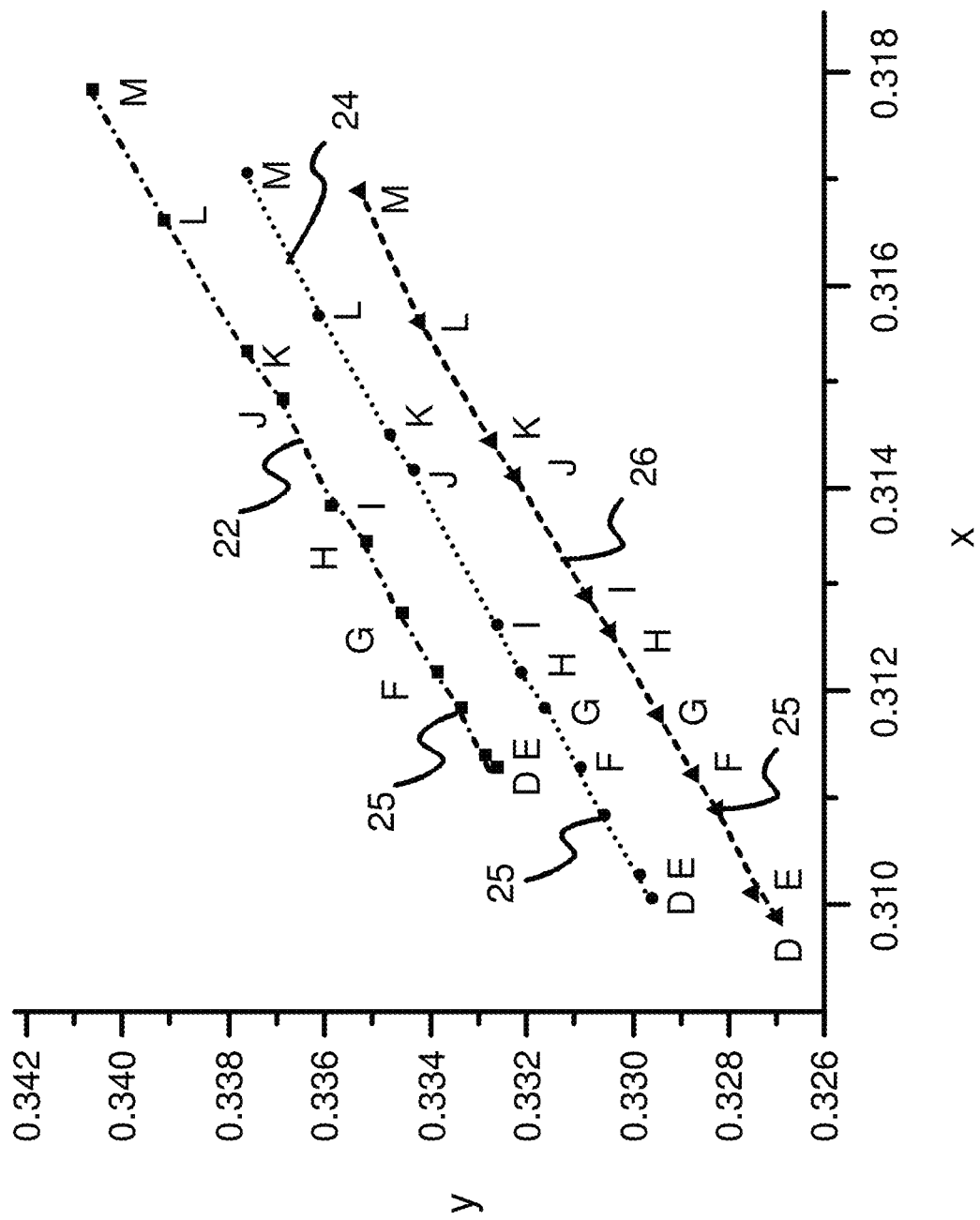
FIG. 8 is a graph of chromaticity with x,y color values for master stones using the diamond color grading machine.

FIG. 8 is a graph of chromaticity with x,y color values for master stones using the diamond color grading machine. During each evaluation run or trial, rotating plate 30 is rotated Nt times and camera 40 captures Nt photos.

Although there is an offset of run 22 and run 26 compared to run 24, the 10 master stones D-M are in the correct sequence within each trial. Although master stones D and E are closer together than for other master stones F-M, master stone D still has lower x,y values than master stone E. Sample stone 25 is correctly located between master stones E and F in all three runs 22, 24, 26, allowing for sample stone 25 to be correctly evaluated as color grade E. Re-generating the x,y values for the master stones for each evaluation run for a sample stone corrects for the offsets between runs 22, 24, 26 that can occur as temperature and other operating conditions vary.

Evaluating the color of each master stone while evaluating the color of the sample stone acts as an internal reference to correct for operating condition color offsets. Thus it is not necessary to perform calibration before each evaluation run. The relative sequence of each master stone within the D to M range remains consistently accurate. After evaluation runs on different days, the distance and slope between two adjacent grades in the entire baseline by master stones from D to M is reproducible. For sample diamond color evaluation, the results of the sample diamond consistently shows an accuracy within 0.5 of a color grade after each evaluation run.

Figure 9A:
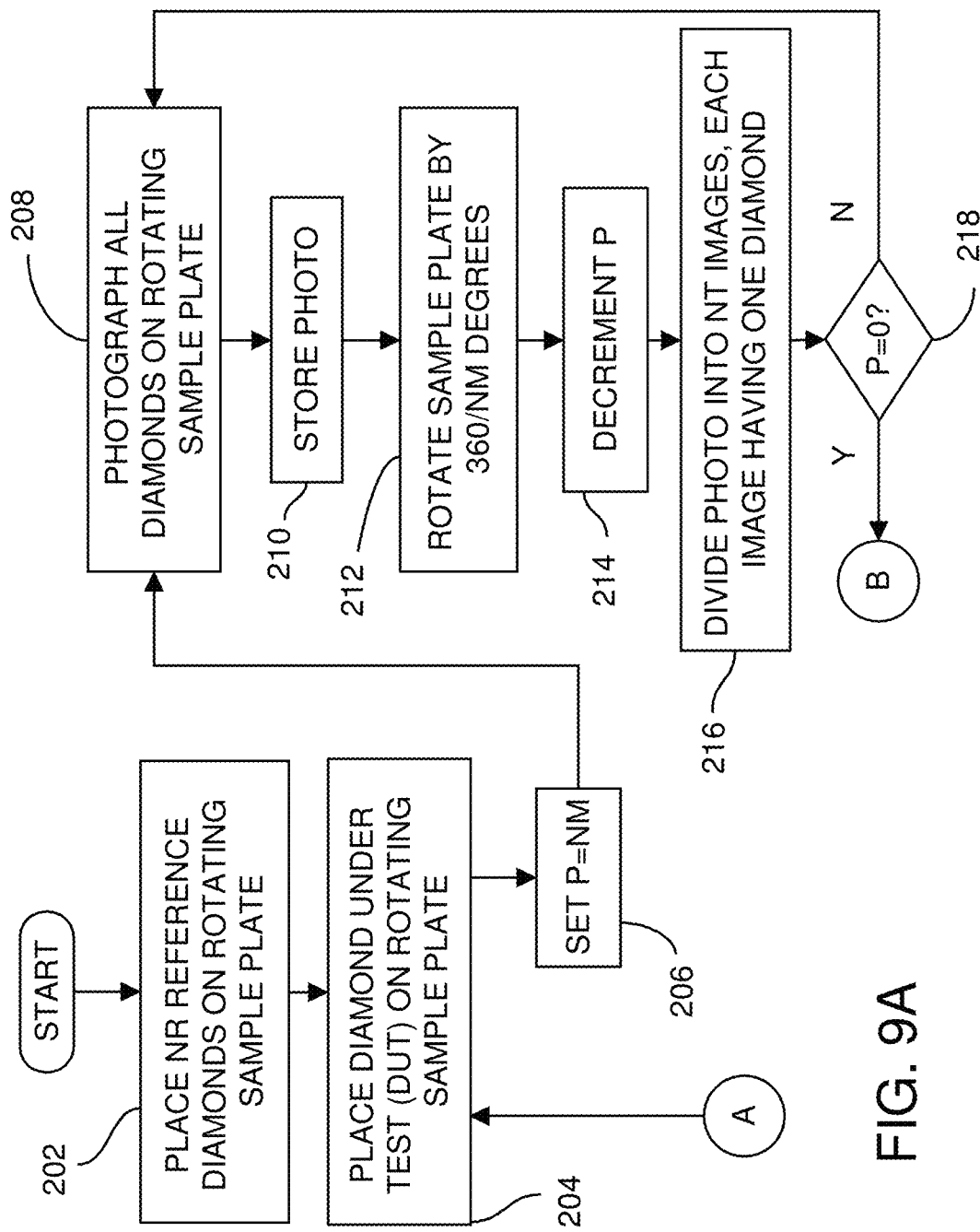

FIGS. 9A-9D show a flowchart of operation of the diamond color-grading machine. In FIG. 9A, a total of Nr master stones 10 are placed onto mounts 32 or holders 73 on rotating plate 30, step 202. These master stones 10 remain on rotating plate 30 as many sample diamonds 18 are placed onto and removed from rotating plate 30 during continuous-line testing.

The Diamond Under Test (DUT), sample diamond 18, is placed onto rotating plate 30, step 204. Input conveyor 60 may move sample diamond 18 to be near rotating plate 30 and then robotic arm 72 picks up sample diamond 18 and places it in mount 32 or holder 73 on rotating plate 30.

In step 206, parameter P is set to the total number of mount 32 on rotating plate 30, Nm, which may be more than Nt when some of mount 32 are vacant with no gemstone. Nt, is the sum of the number of sample diamond 18 (Ns) and the number of master stones 10 (Nr).

Camera 40 captures a photo of rotating plate 30 with all its diamonds, step 208, for an initial rotational position. This photo is stored for later access and processing by the computer, step 210. Step motor 24 is then activated to rotate rotating plate 30 by an angle of 360/Nm degrees, step 212. This rotation causes diamonds to be located at the same positions as in the prior photo (step 208), but a different diamond is in each of these positions, as all diamonds are shifted by one position in the direction of the rotation. Parameter P is decremented, step 214 to track the number of partial rotations.

The photo of all Nt diamonds on rotating plate 30 from step 208 is divided into Nt smaller images, step 216. Each of these smaller images generated in step 216 contains only one diamond, while the larger photo from step 208 has Nt diamonds in it. Image processing software running on the computer such as object detection routines can detect the outlines of each diamond against the dull while background of rotating plate 30 and shell 46, and the detected outlines used to cut the photo into the smaller images.

When step parameter P has not yet reached zero, step 218, then camera 40 captures another photo of all Nt diamonds, but rotated into new positions, while step 216 isolates each diamond into a separate smaller image. This loop is repeated Nm times so that each diamond is photographed in each of the Nm positions relative to camera 40. Any slight variation in lighting for positions within chamber 20 are applied to all Nt diamonds by this loop that rotates sample diamond 18 through all Nm positions.

In FIG. 9B, after all Nm photos have been taken, and each divided into Nt smaller images, there are Nm*Nt smaller images. For each of these Nm*Nt images, step 220, target area 48 is selected within that smaller image, step 222. This target area 48 can be selected as an area within the diamond, or even selected as an area within one face of the diamond, or an area within the diamond's outline that has good uniformity of color. Areas with the diamond's outline with saturated and dark or sharp and abrupt changes in color may be removed from target area 48 as these may be reflections or image distortions.

The Red Green Blue (RGB) pixel values for all pixels within target area 48 are obtained from the smaller image, step 224. The computer then converts these RGB values into XYZ values in the CIE XYZ tristimulus color space, step 226. The computer then further calculates these XYZ values into xy values in the CIE chromaticity space, step 230.

The computer then generates the average x value and the average y value over all the xy pixel values for all pixels in target area 48 in the current smaller image, step 232. The average x value and the average y value are stored for this smaller image, step 234.

This image processing loop, steps 222-234, is repeated for all of the smaller images, step 236, for a total of Nm*Nt loops. Once all Nm*Nt smaller images have been processed, step 236, then Nm*Nt average values of x,y are stored.

Figure 9C:
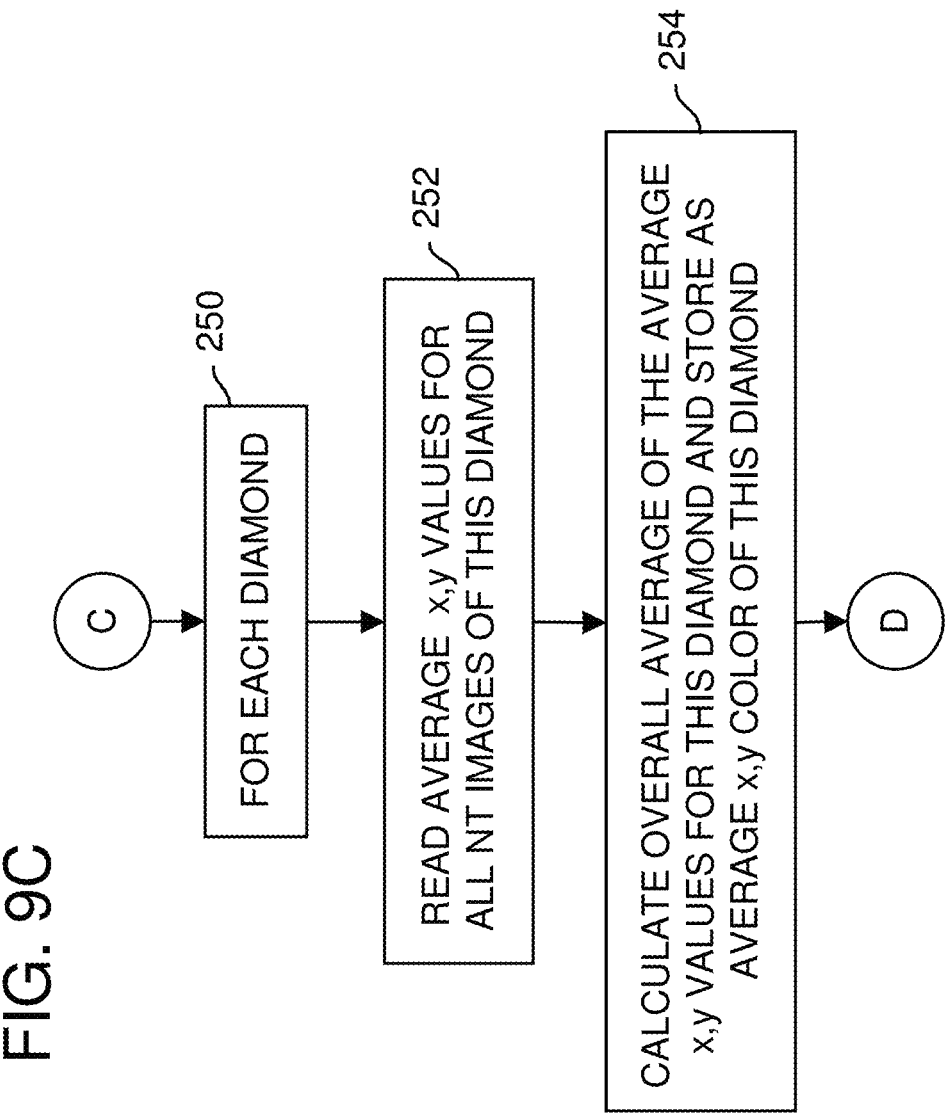

In FIG. 9C, the computer tracks which of the smaller images are for which of the master stones 10 and sample diamond 18, by tracking rotations of step motor 24 and placement of sample diamond 18. For each diamond, step 250, such as for sample diamond 18 or for each of master stones 10, there are Nt smaller images for each diamond and Nt average values of x and y. These Nt average x,y values for that diamond are read, step 252, and the Nt average x values are averaged to obtain the average x color of this diamond, and the Nt average y values are averaged to obtain the average y color of this diamond, step 254.

When FIG. 9C finishes, there is an average x,y color for sample diamond 18, and there is an average x,y color for the grade D diamond of master stones 10, and an average x,y color for the grade E diamond of master stones 10, etc.

In FIG. 9D, these Nr average x,y colors for the Nr grades of diamond of the Nr master stones 10 are arranged in grade order and stored as a reference database, step 248. The average x,y color of sample diamond 18 is compared to the average x,y values in this database, step 240, to find the closest less-color (left) master stones. For example, the color grade number value of either sample stone 18 or master stones 10 can be calculated as the projection position of a line, which is fitted by average x,y colors of master stones 10. The master stone with the largest number value that is smaller than sample diamond 18 is selected as the closest less-color reference, step 242.

The left reference effectively "rounds up" to the better color grade, so that the closest master stone has less color than the sample gemstone. The computer sends the color grade determined in step 242 to output sorter 64, which moves the bins so that target bin 68 for this grade is aligned with output conveyor 62. Robotic arm 72 picks up sample diamond 18 from rotating plate 30 and places sample diamond 18 onto output conveyor 62 and into target bin 68, step 244. The computer may need to activate step motor 24 to bring sample diamond 18 into alignment with output conveyor 62 and then again to bring the empty holder 73 into alignment with input conveyor 60 to allow placement of the next DUT, steps 246, 204.

Figure 10:
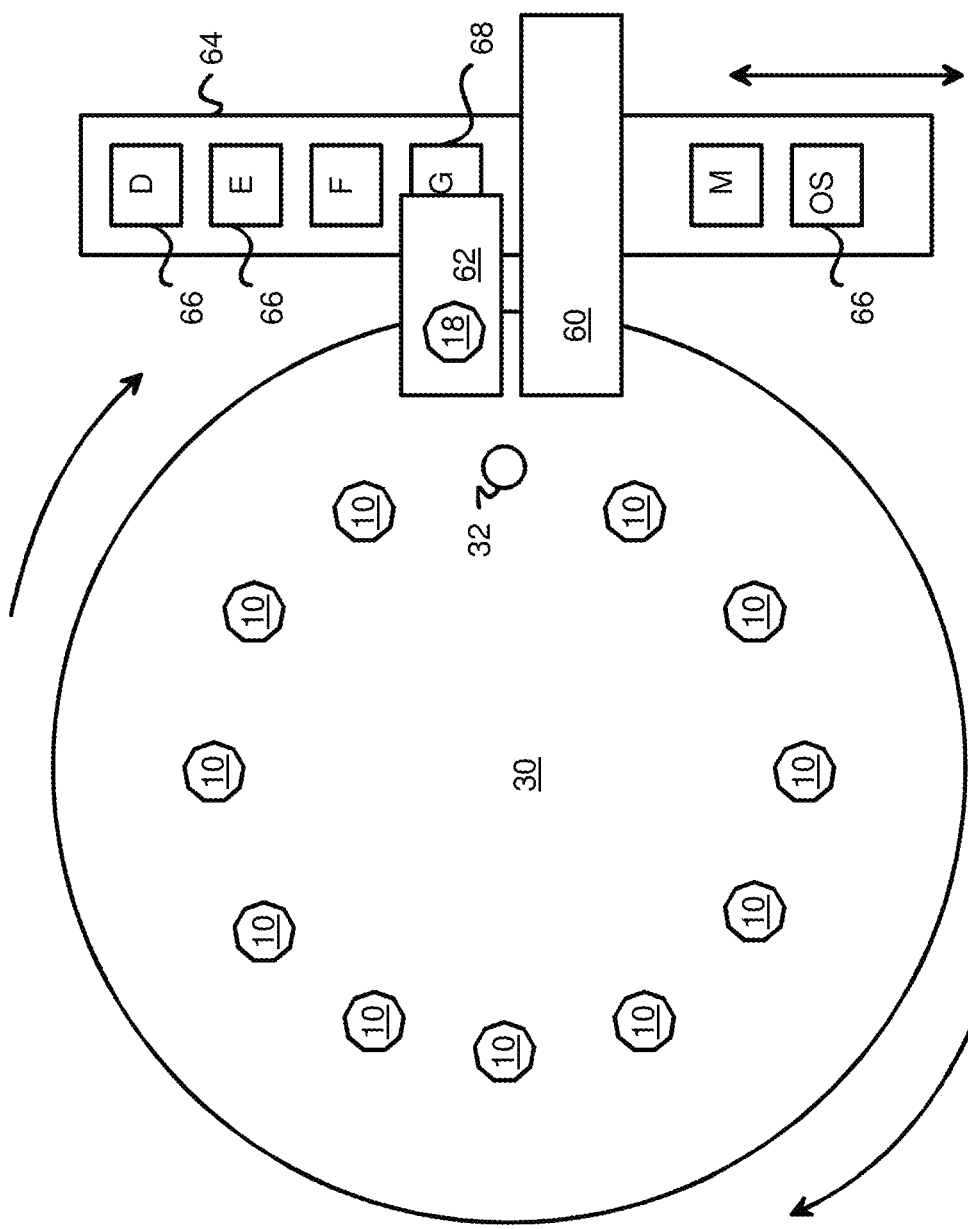
FIG. 10 is a diamond color grading machine having input and output conveyors on the same side.

FIG. 10 is a diamond color grading machine having input and output conveyors on the same side. In this alternative, input conveyor 60 and output conveyor 62 are both on the right side of rotating plate 30. Input conveyor 60 and output conveyor 62 can be located next to each other above rotating plate 30, or input conveyor 60 can be located above or below output conveyor 62. Output conveyor 62 can end over target bin 68 on output sorter 64 while input conveyor 60 can extend over output sorter 64 to access a bin (not shown) of input sample diamonds 18 that are located beyond output sorter 64. A single robotic arm 72 could move sample diamond 18 among rotating plate 30 and input conveyor 60 and output conveyor 62.

Figure 11:
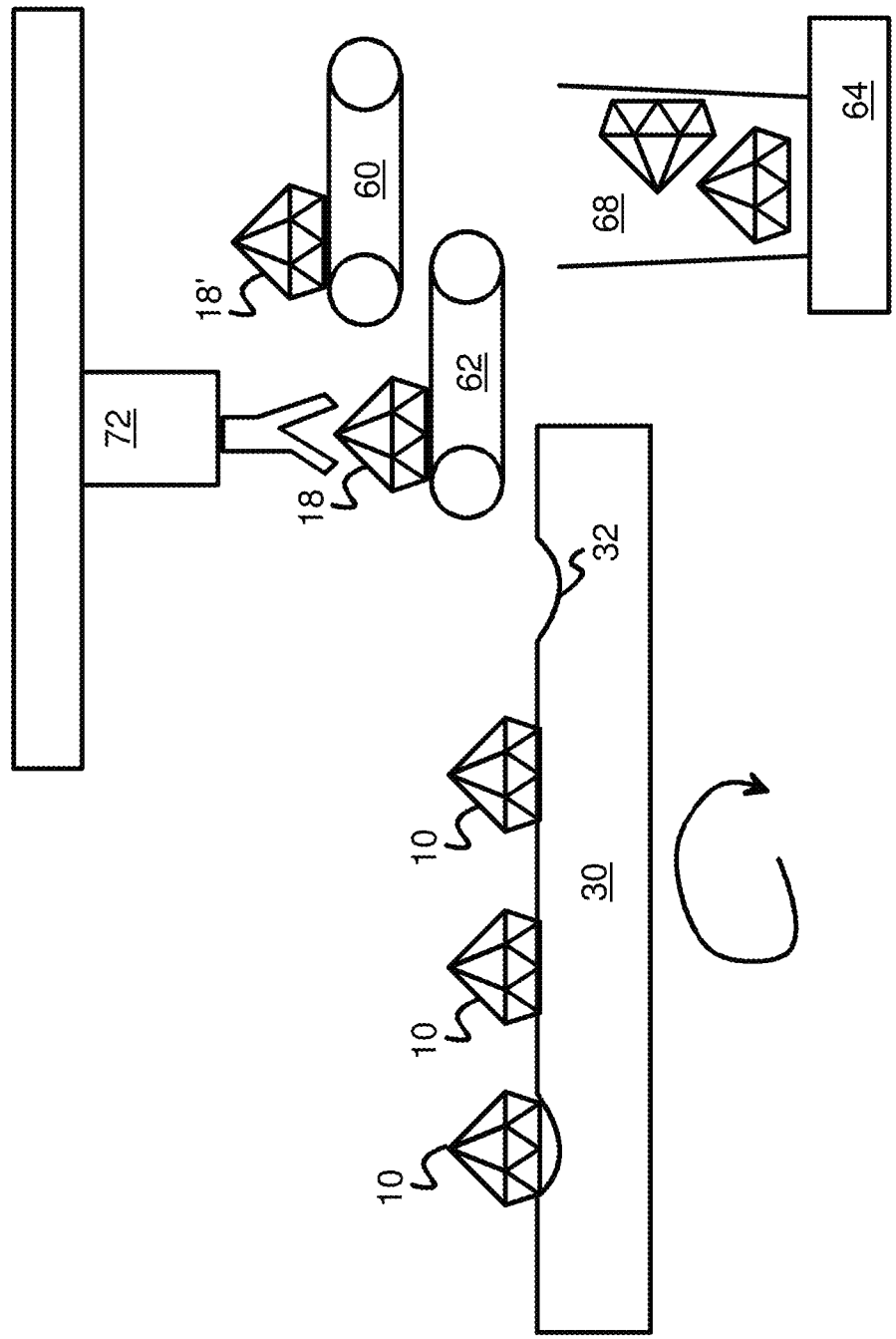
FIG. 11 is a side view of a diamond color grading machine having input and output conveyors on the same side but on different levels.

FIG. 11 is a side view of a diamond color grading machine having input and output conveyors on the same side but on different levels. In this alternative, input conveyor 60 and output conveyor 62 are both on the right side of rotating plate 30. Input conveyor 60 and output conveyor 62 are located next to each other above rotating plate 30, while input conveyor 60 is located above output conveyor 62. Output conveyor 62 can end over target bin 68 on output sorter 64 while input conveyor 60 can extend over output sorter 64 to access a bin (not shown) of input sample diamonds 18 that are located beyond output sorter 64. A single robotic arm 72 could move sample diamond 18 among rotating plate 30 and input conveyor 60 and output conveyor 62.

Figure 12B:
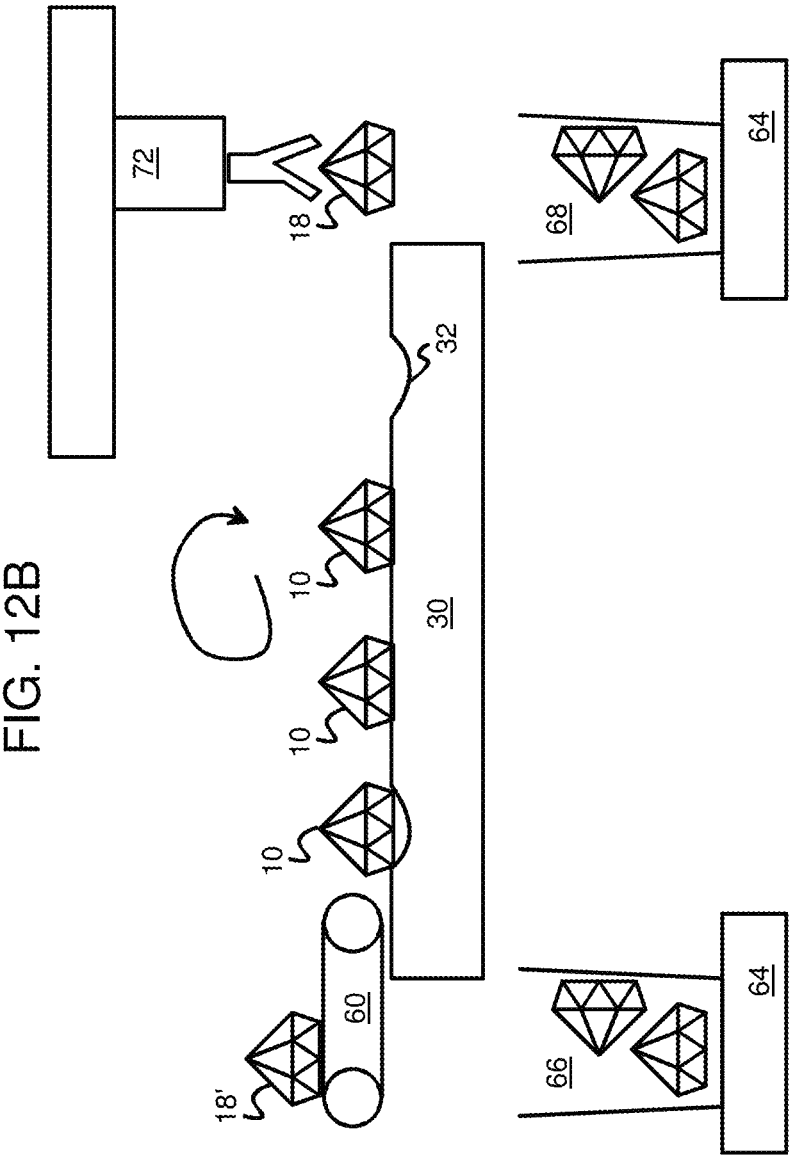

FIGS. 12A-12B show a side view of an alternative diamond color grading machine with an annular output sorter. In FIG. 12A, input conveyor 60 moves sample diamond 18' and drops sample diamond 18 into a vacant mount 32 on rotating plate 30.

In FIG. 12B, after evaluation is completed, robotic arm 72 picks up sample diamond 18 from rotating plate 30 and drops sample diamond 18 into target bin 68. Robotic arm 72 can softly place sample diamond 18 into target bin 68 rather than allowing sample diamond 18 to fall into target bin 68.

Figure 13:
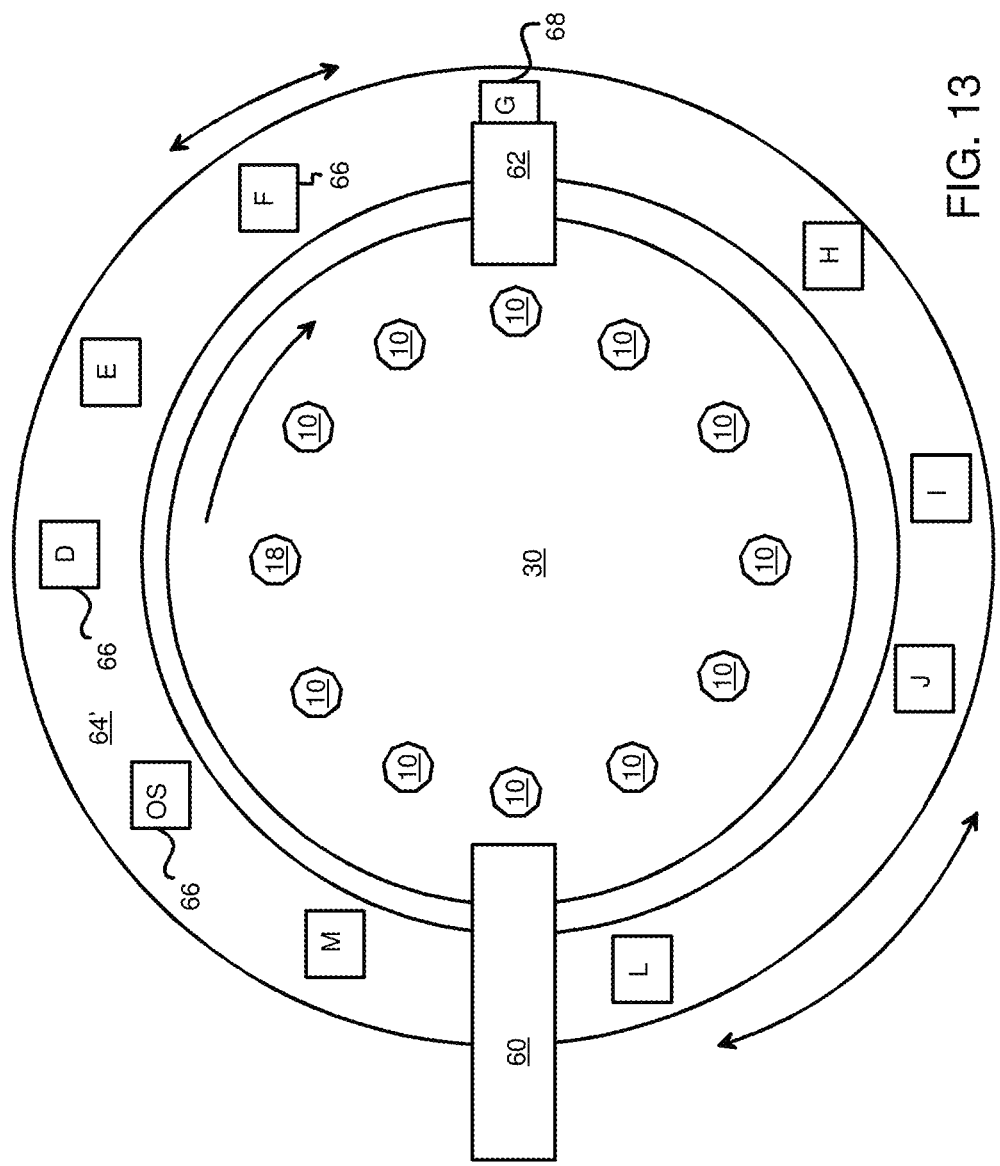
FIG. 13 shows a top view of the alternative diamond color grading machine with an annular output sorter of FIG. 12A-12B.

FIG. 13 shows a top view of the alternative diamond color grading machine with an annular output sorter of FIG. 12A-12B. Output sorter 64' forms an annular ring around rotating plate 30, with bins 66 arranged outside of the perimeter of rotating plate 30. Computer 50 instructs output sorter 64' to rotate relative to input conveyor 60 and output conveyor 62, which are fixed, to rotate target bin 68 to be under the end of output conveyor 62.

Figure 14:
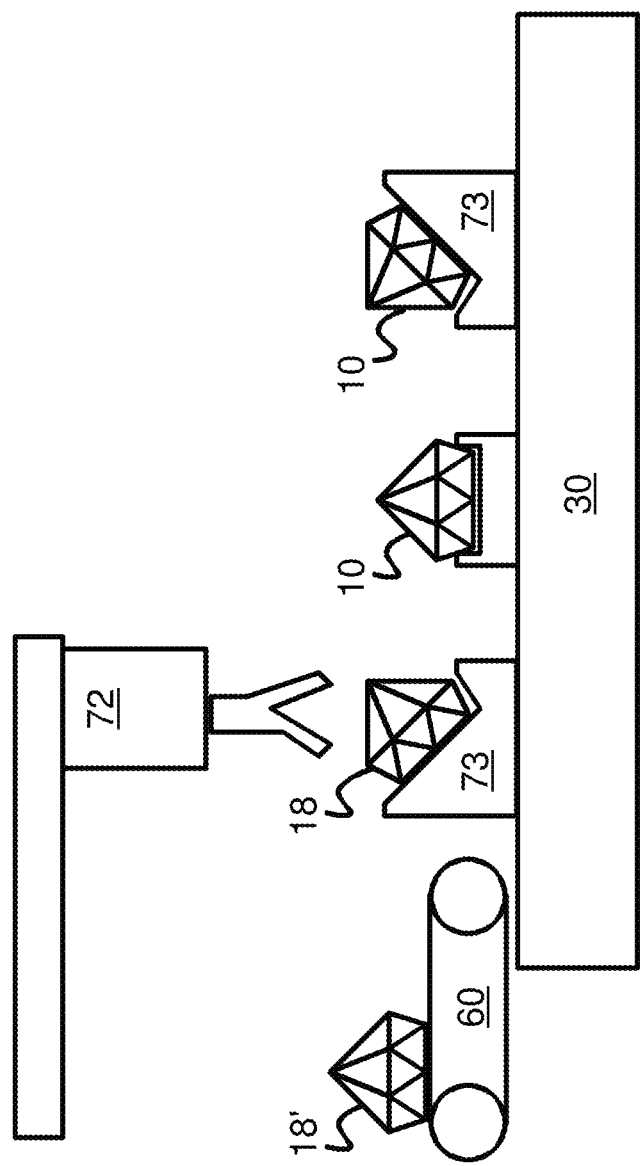
FIG. 14 shows an alternative for the mount on the rotating plate.

FIG. 14 shows an alternative for the mount on the rotating plate. Robotic arm 72 picks up sample diamond 18' from input conveyor 60 and places sample diamond 18 into holder 73. Holder 73 is a V-shaped fixture that is mounted to the top surface of rotating plate 30. Holder 73 holds sample diamond 18 or master stones 10 at a standard designed angle to the top surface of rotating plate 30. When camera 40 is mounted directly overhead, as shown in FIG. 15, holder 73 makes the viewing angle exactly 45 degrees to meet the GIA standard for viewing by camera 40. The viewing angle is between camera 40 and the axis of the stones through the culet and normal to the table facet (top surface) of sample diamond 18 or master stones 10. Also, when robotic arm 72 drops sample diamond 18 into holder 73, the slope of the grove in holder 73 helps guide sample diamond 18 into position within holder 73.

FIG. 15 is an alternative diamond color grading machine with the camera directly over the rotating plate of diamonds. When holders 73 (FIG. 14) are used with a V-shaped bottom, master stones 10 and sample diamond 18 are held at an angle to rotating plate 30. To achieve a viewing angle between camera 40 and an axis of the gemstones through the culet and normal to the table facet (top surface) of sample diamond 18 or master stones 10 in holders 73, camera 40 and bracket 44 are moved to an opening at the top of shell 46. Light source 42 may also be placed below rotating plate 30 to provide appropriate lighting within chamber 20. There may be additional light sources within shell 46 to provide optimal lighting.

Alternate Embodiments

Several other embodiments are contemplated by the inventors. For example many combinations and variations of the apparatus and methods are possible. In FIG. 9, color conversion, target area 48 detection, and pixel averaging could be performed after all Nm photos are captured, or could be performed after each photo is captured. All RGB pixels in the target area could be averaged together to get an average RGB value for the target area, and then the average RGB converted to an average XYZ and then to an average x,y value in steps 226, 230, 232 of FIG. 9B. Averaging all pixels could also be performed after conversion to XYZ and before conversion to x,y. Rather than convert RGB to XYZ and then to xy, a single conversion could be performed from RGB to xy. Rather than a 2-dimensional x,y graph, a 3-dimensional R, G, B graph could be used for color grading without conversion to x,y values, although this may provide less accuracy and more computational work.

Rotating plate 30 could be circular, or might have some other shape that still provides clearance for rotation within shell 46. Shell 46 can be a sphere, or could have other shapes. A sphere is considered better for integrating light and providing flat background lighting, but other shapes for shell 46 might still provide adequately uniform lighting even if less ideal.

There may be additional light sources other than light source 42 within shell 46 to provide optimal lighting. The position and number of light sources could be modified, and the intensity and color profile of the light source may be adjusted, such as under program control. The program could adjust the while balance or color temperature of light source 42 within a range, such as 5500-6500K. Testing may be performed to find optimal settings of light source intensity and color temperature that produce the best uniformity of the background light within chamber 20 for color grading accuracy.

A cutout or hole in the side of shell 46 may be provided to allow input conveyor 60 to enter chamber 20. Alternately, input conveyor 60 may end outside of shell 46 and then a robotic arm could pick up sample diamond 18 from input conveyor 60 outside of shell 46 and move sample diamond 18 through the hole and into chamber 20 and place sample diamond 18 on mount 32 on rotating plate 30. This may allow for a smaller hole in shell 46 and less non-uniformity of the background light within chamber 20. The alternatives of FIGS. 10, 11 may have better lighting since they have input conveyor 60 and output conveyor 62 on the same side. Then a single robotic arm 72 could use a single hole in shell 46 rather than require a second hole for output conveyor 62. This hole in shell 46 could have a door or curtain that closes after robotic arm 72 loads sample diamond 18 unto rotating plate 30. Such a door could provide a more uniform lighting within chamber 20 compared to leaving the hole in shell 46. The door could be painted the same dull while as the interior of shell 46.

While output sorter 64 with bins 66 and target bin 68 have been described, bins could be sacks or bags or other collection devise with flexible sides. Output sorter 64 could move bins 66 to select target bin 68 in various ways other than linear or rotational. Many variations and physical configurations of output sorter 64, input conveyor 60, output conveyor 62, and robotic arm 72 are possible.

Robotic arm 72 could have a clamp to grab sample diamond 18, or could have a small tube with an applied vacuum to hold sample diamond 18 during movement. Robotic arm 72 could pivot in various ways to better align sample diamond 18 onto mount 32. When robotic arm 72 has a wide range of motion and length of travel, alignment with sample diamond 18 on rotating plate 30 does not have to be as exact. Robotic arm 72 may be able to pick up diamonds from several of the holders on rotating plate 30, allowing some rotation for alignment to be avoided. Input conveyor 60 can be used, and the robotic arm used to drop the sample diamond into the target bin directly, eliminating output conveyor 62.

Mount 32 could have various shapes and features to better hold and align sample diamond 18, and could hold sample diamond 18 at angles to the plane of rotating plate 30. The location of camera 40 could be adjusted from the 45-degree location shown in FIG. 3 when mount 32 has a built-in angle, allowing viewing from camera 40 to be 45 degrees to the axis of sample diamond 18 and master stones 10 on rotating plate 30. Other viewing angles could be substituted for 45 degrees.

The interior of shell 46, the surface of rotating plate 30, and mount 32 or holders 73 could be painted with a same dull-white color, or could be made from a dull while plastic or other material. There could be some non-uniformities, such as screw heads, gaps, or seams, but ideally these are kept to a minimum so as to improve light uniformity within chamber 20.

A variety of kinds of mount 32 or holders 73 may be used. Ideally, sample diamond 18 and master stones 10 all use the same mount 32 or holder 73, but sample diamond 18 could be fitted with a holders 73 that differs from mount 32 for master stones 10, but mount 32 and holders 73 should not introduce non-uniformities in the images captured by camera 40, or these non-uniformities should be able to be removed when target area 48 is selected from the larger photos. Target area 48 may be a composite of several areas within a diamond that are all included in image processing and averaging for that diamond. Target area 48 can be non-contiguous rather than one distinct area bounded by a polygon. Mount 32 or holders 73 may be fixtures or may be integral with rotating plate 30.

The master stones can all have the same carat weight, which is ideally the same carat weight as the sample diamond. Cut and clarity can also be the same or similar for all master stones in the set of master stones. The better matched master stones 10 to sample diamond 18, the better the color grading can be. However, the automated color grading system might also work adequately when matching is not ideal, although there may be some loss of accuracy. The master stones 10 may be placed on rotating plate 30 in order of their known color grade, or may be placed in a random order. However, the program can be instructed when grade diamond is placed on which location on rotating plate 30 so that the program can track these diamond grades. Alternatively, the program could determine the grades from the x,y values and order of the x,y values for the master stones.

An alternate for unloading sample diamond 18 onto output conveyor 62 is an eject mechanism in mount 32 that can eject sample diamond 18 from mount 32 and onto output conveyor 62. Another alternative is that rotating plate 30 may be fitted with a trap door under mount 32 that opens to allow sample diamond 18 to fall through the trap door in rotating plate 30 and onto output conveyor 62 or target bin 68 placed below rotating plate 30.

The locations of mount 32 or holders 73 on the top surface of rotating plate 30 can be separated by equal angles, and can have and equal distance to the center of rotating plate 30. Thus when rotating plate 30 is rotated by 360/Nm degrees, where Nm is the number of mounts 32 or holders 73, camera 40 sees a different one of master stones 10 or sample diamond 18 in the same location as a prior diamond. An alternative may use non-equal angles, or may have some diamonds that are farther from the center of rotating plate 30 than others, and the program may map these variations. Mount 32 can be in a non-circle or in an arc-shape that is an arc along a circle. There can be vacant mounts having no gemstone when Nm>Nt. For example, there can be 6 mounts and only 3 gemstones on rotating plate 30. To obtain the best results, it is desired to have the same lighting conditions of each gemstone at each position. For example, if there are 6 mounts and the last 3 mounts are vacant, stone 1 can be shot at Photos No. 1 2, 3. But Stone 2 can be shot at Photos No. 2, 3, 6, and Stone 3 at Photos No. 1, 5, 6. In this example, rotating plate 30 can be rotated Nm=6 times although there are only 3 gemstones (Nt=3). The gemstones can be put in any vacancy on rotating plate 30.

While a single sample diamond 18 has been shown on rotating plate 30, there could be more than one sample diamond 18, such as Ns. Also, the number of master stones 10, Nr, can vary, as can the total number of diamonds, Nt=Ns+Nr. There may also be empty mount 32 or holders 73 on rotating plate 30 that are not occupied by a diamond. The program can filter out these locations of unoccupied mounts and not include them. The program can track each one of master stones 10 and its current location on rotating plate 30 as step motor 24 is activated, and these locations of the same master stone 10 averaged together once all Nt locations of rotating plate 30 have been captured.

While the CIE XYZ color space has been described, other color spaces could be used. For example, camera 40 may capture pixels using RGB, and then RGB may be converted to XYZ by a processor or computer. XYZ is preferred over RGB because Y is the luminance or intensity and does not have color information, so color is expressed by just two variables X, Y in and XYZ color space, rather than three variables R, G, B. The use of 2 variables allows for easier graphing and comparing of color values. Removing the Z luminance component helps to mask out variations in the brightness of the lighting within chamber 20 and provide more accurate color grading. Conversion among several color spaces, such as XYZ and xyZ, may be performed by the computer. Other color spaces may be used, such as CIE Lab, Hue Saturation, Lightness (HSL), or Hue Saturation, Value (HSV). Various filters and image processing may be performed as well.

When camera 40 outputs RGB, steps 224, 226 of FIG. 9B are used. When camera 40 can output XYZ, then steps 224, 226 can be skipped or modified.

While camera 40 has been shown, various image sensors could be used, and various lens systems could funnel light to the image sensor. There could be more than one camera 40 mounted to shell 46, allowing multiple simultaneous photos to be captured for different viewing angles to rotating plate 30. The angle of camera 40 to rotating plate 30 could be adjustable, and various mounts or bracket 44 could be substituted.

While having camera 40 capture a photo every 360/Nm degrees of rotation of rotating plate 30 has been described, additional images could be captured at smaller rotational increments. For example, an image could be captured every 360/(2*Nm) degrees, and the number of images averaged together doubled. This might improve accuracy. Alternately, camera 40 could be a video camera that captures a continuous series of frames, and computer 50 could select frames at the desired rotational intervals.

There could be additional mounts 32 that are not occupied by a diamond, and these vacant mounts could be ignored by the image processing of computer 50. When Ns is 2 or more, computer 50 can color-grade 2 or more sample diamonds during one 360-degree rotation, improving throughput.

While diamonds have been described, other precious stones could be substituted. While a round or circular rotating plate 30 has been described, rotating plate 30 could be elliptical, octagonal, square, or have other shapes that still allow sufficient clearance for rotation within chamber 20. Computer 50 can be a Personal Computer (PC), a controller or a processor with a memory such as a semiconductor main memory, and may have mass storage such as a flash drive or hard disk drive and may have I/O such as an interface to a network such as the Internet. Computer 50 may offload some processing tasks to external servers, such as specialized image processing tasks. Neural networks may be used for some processing tasks. The steps of FIG. 9 may be implemented by a computer executing machine-readable instructions that controls step motor 24 and the robotic arm and conveyors and camera.

Various values may be calculated rather than stored. For example, once all Nm*Nt smaller images have been processed, step 236, FIG. 9B, then Nm*Nt average values of x,y are stored. Alternatively, the original Nm*Nt x,y values can be stored instead of the average values of x,y. Then the Nt average x,y values can be calculated when needed in FIG. 9C.

Input conveyor 60, robotic arm 72, rotating plate 30, and output conveyor 62 can allow for a continuous line of diamonds to be tested as sample diamond 18. When bins 66 on output sorter 64 become full, the machine may be paused to allow swapping the full bin for an empty bin, or for removal of the sorted diamonds from output sorter 66. Untested diamonds may be poured into an input bin that feeds diamonds to input conveyor 60. Of course, the continuous line of diamonds may be paused for various reasons such as loading, unloading, error handling, maintenance, or at the end of the day when work stops. Many color grading machines may be operated by a human operator, eliminating the need for skilled, highly-trained human experts to view each diamond.

Terms such as up, down, above, under, horizontal, vertical, inside, outside, are relative and depend on the viewpoint and are not meant to limit the invention to a particular perspective. Devices may be rotated so that vertical is horizontal and horizontal is vertical, so these terms are viewer dependent.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. An automated gemstone color-grading machine comprising:
   a rotating plate having mounts on a surface, the mounts each for supporting a gemstone;
   wherein gemstones on the mounts include a sample gemstone and a series of master gemstones, wherein the series of master gemstones has master gemstones of varying known color grades;
   wherein the sample gemstone has an unknown color grade that is between at least two of the known color grades of the master gemstones;
   a step motor for rotating the rotating plate by one or more increments that are less than a full rotation;
   an image sensor for capturing images of the gemstones on the mounts on the rotating plate;
   a light source for illuminating the gemstones on the rotating plate;
   a computer for instructing the step motor to rotate the rotating plate by an increment so that the sample gemstone is rotated to a position in the image sensor's field of view that was previously occupied by one of the master gemstones; the computer causing the image sensor to capture an image after each increment of rotation as the sample gemstone is successively rotated into all positions previously occupied by the master gemstones on the rotating plate;
   wherein each master gemstone successively occupies positions of the sample gemstone and other master gemstones as the rotating plate is incremented;
   the computer executing machine-readable instructions that cause the computer, for the sample gemstone and for each of the master gemstones, to select pixels for that gemstone from images captured by the image sensor after each increment of rotation, the computer averaging color indexes of these pixels for each gemstone over all incremented positions of the gemstone to generate a gemstone average color value for each gemstone, the computer selecting one of the master gemstones as a closest gemstone that has a smallest difference in the gemstone average color value for the sample gemstone and the master gemstone, the computer outputting an indication of the known color grade of the closest gemstone as a color grade of the sample gemstone,
   whereby the color grade of the sample gemstone is determined by averaging color indexes from pixels of gemstones captured by the image sensor over different rotational increments.

2. The automated gemstone color-grading machine of claim 1
   wherein the gemstones are diamonds;
   wherein the closest gemstone has a smallest negative difference between the gemstone average color values of the sample gemstone and each of the master gemstones; and
   wherein the sample gemstone has more color than the closest gemstone.

3. The automated gemstone color-grading machine of claim 2 further comprising:
   a shell that encloses the rotating plate and that permits the image sensor to view the gemstones on the rotating plate;
   an interior of the shell and the rotating plate having a dull white color to provide a flat background in images captured by the image sensor.

4. The automated gemstone color-grading machine of claim 3 wherein the shell is a sphere having cutouts, including an image sensor cutout for the image sensor and an insertion cutout to allow the sample gemstone to be placed on an empty mount on the rotating plate and to be removed from the mount on the rotating plate after the color grade of the sample gemstone is determined by the computer.

5. The automated gemstone color-grading machine of claim 4 further comprising:
   a robotic arm for picking up the sample gemstone from an input of sample gemstones and placing the sample gemstone into an empty mount on the rotating plate, the robotic arm reaching through the insertion cutout in the shell.

6. The automated gemstone color-grading machine of claim 5 wherein the robotic arm also reaches through the shell to pick up the sample gemstone from the mount on the rotating plate after the color grade of the sample gemstone is determined by the computer, the robotic arm placing the sample gemstone into an output bin containing sample gemstones of a same color grade determined by the computer.

7. The automated gemstone color-grading machine of claim 6 further comprising:
   an output sorter having a plurality of output bins, each output bin for a different color grade of the sample gemstone, the output sorter for receiving the color grade determined by the computer and for moving a target bin having the color grade to an output position to receive the sample gemstone from the robotic arm.

8. The automated gemstone color-grading machine of claim 6 further comprising:
   an input conveyor for moving sample gemstones from an input bin of sample gemstones with unknown color grades to an input position to permit the robotic arm to pick up the sample gemstone and place the sample gemstone on the mount on the rotating plate.

9. The automated gemstone color-grading machine of claim 3 wherein the image sensor is a camera that is mounted to the shell at a 45-degree angle to a surface of the rotating plate;
   wherein the light source has a fixed color temperature between 5500K and 6500K.

10. The automated gemstone color-grading machine of claim 3 wherein the series of master gemstones comprise at least 10 gemstones of at least 10 different known color grades;
    wherein the step motor rotates the rotating plate by at least 11 increments and the image sensor captures images for all of the at least 11 increments.

11. The automated gemstone color-grading machine of claim 3 wherein pixels from images captured by the image sensor are converted to x and y color values in an xy color space,
    wherein the computer has an image processor that identifies boundaries of gemstones in the images, and selects pixels from target areas within the boundaries for averaging;

wherein for the sample gemstone and for each master gemstone, pixels are averaged from target areas for that gemstone from images captured for all of the increments of the rotating plate.

12. The automated gemstone color-grading machine of claim 11 wherein the computer selects the closest gemstone by generating differences of averaged x and y color values, each difference being between an averaged x and y value of the sample gemstone and an averaged x and y value of one of the master gemstones,
wherein the closest gemstone is a closest less-color gemstone having less color than the sample gemstone.

13. The automated gemstone color-grading machine of claim 3 wherein the mounts on the rotating plate are each located at a same radial distance from a center of the rotating plate;
wherein the mounts are separated by equal distances to closest neighboring mounts on the rotating plate;
wherein the mounts are located along a circle on the rotating plate;
wherein the camera captures images of all gemstones at all incremented positions of the rotating plate under a same lighting condition.

14. The automated gemstone color-grading machine of claim 1 wherein the mounts are fixtures that hold the gemstones at an angle to a surface of the rotating plate;
wherein the image sensor is mounted to the shell so that an axis of the gemstone has a 45 degree angle to the image sensor.

15. A system for evaluating diamond color comprising:
a rotating plate having mounts arranged along a circle on a surface, the mounts each for holding a diamond;
wherein Nr mounts are pre-loaded with master stones, the master stones being diamonds with a known color grade, wherein Nr master stones have Nr different color grades, wherein Nr is a whole number of at least 3;
wherein Nm is a total number of mounts on the rotating plate, wherein Nm is a whole number of at least 4;
wherein Ns mounts are loaded and unloaded with Ns sample diamonds having an unknown color grade, wherein Ns is a whole number of at least 1, wherein Nt is Ns+Nr;
a camera that captures images of diamonds on the mounts on the rotating plate;
a light source that illuminates the diamonds on the rotating plate;
a chamber that partially surrounds the rotating plate and provides a background of diffuse light for the camera;
an input loader that loads sample diamonds from an input diamond bin outside the chamber onto the Ns mounts on the rotating plate;
an output loader that removes sample diamonds from the Ns mounts on the rotating plate after evaluation;
an output sorter that places sample diamonds from the output loader into sorted bins that are sorted by an evaluated color grade of the sample diamonds;
a step motor that rotates the rotating plate;
a color evaluation routine, executing on a computer that controls the step motor, the input loader, the output loader, the output sorter, and the camera, the color evaluation routine comprising:
instructing the input loader to load a sample diamond onto the rotating plate;
(a) instructing the camera to take a photo of the rotating plate, the photo including all diamonds on the rotating plate;
(b) instructing the step motor to rotate the rotating plate by an increment;
repeating steps (a) and (b) until the rotating plate has been incremented Nm times;
dividing each of Nm−1 photos into Nt images, each image having one diamond;
for each image, selecting a target area on the image that is within a boundary of the diamond in the image;
reading pixel values for pixels within the target area and converting each of these pixel values into an x color value and a y color value;
calculating an average x color value and an average y color value of pixels within the target area for each image;
for the sample diamond and for each of the master stones, calculating a stone average x color value as an average of the average x color value for all images having a particular stone, and calculating a stone average y color value as an average of the average y color value for all images having the particular stone;
generating a color grade number value with an x,y color space for the sample diamond and each of the master stones, the color grade number value being calculated as a projection position of a line fitted by the stone average x color value and the stone average y color value of the master stones;
finding a selected master stone having a largest value of the color grade number value, wherein the selected master stone has a color that is clearer than a color of the sample diamond;
outputting an indication of a known color grade of the selected master stone as the evaluated color grade of the sample diamond;
instructing the output loader to remove the sample diamond from the rotating plate and instructing the output sorter to place the sample diamond into a sorted bin for the evaluated color grade of the sample diamond,
whereby sample diamonds are loaded and unloaded onto the rotating plate and color evaluated by comparison to master stones in the x,y color space.

16. The system of claim 15 wherein the camera captures images having Red Green Blue (RGB) pixels;
wherein the RGB pixels are converted to x and y color values.

17. The system of claim 15 further comprising:
a robotic arm that reaches through a cutout in the chamber to load or unload the sample diamond onto the rotating plate.

18. The system of claim 17 wherein the output sorter comprises a rotating ring around the chamber having output bins that are rotated into position.

19. The system of claim 15 wherein the x color values and y color values of the master stones are re-generated for each evaluation of the sample diamond.

20. A method for evaluating color of a sample diamond comprising:
placing master stones on mounts on a rotating plate, wherein the master stones are diamonds having a known color grade, wherein there are at least 7 master stones having at least 7 different known color grades;
placing a sample diamond into a mount on the rotating plate;
(a) instructing a camera to take a photo of the rotating plate, the photo including all diamonds on the rotating plate;
(b) instructing a step motor to rotate the rotating plate by an increment;

repeating steps (a) and (b) until the rotating plate has been incremented at least 7 times;

dividing each of the photos into smaller images, each smaller image having one diamond;

for each smaller image, selecting a target area on the smaller image that is within a boundary of the diamond in the smaller image;

reading pixel values for pixels within the target area and converting each of these pixel values into an x color value and a y color value;

calculating an average x color value and an average y color value for pixels within the target area for each smaller image;

for the sample diamond and for each of the master stones, calculating a stone average x color value as an average of the average x color value for all smaller images having a particular stone, and calculating a stone average y color value as an average of the average y color value for all smaller images having the particular stone;

generating a color grade number value with an x,y color space for the sample diamond and each of the master stones, the color grade number value being calculated as a projection position of a line fitted by the stone average x color value and the stone average y color value of the master stones;

finding a selected master stone having a largest value of the color grade number value, wherein the selected master stone has a color that is clearer than a color of the sample diamond;

outputting an indication of a known color grade of the selected master stone as the evaluated color grade of the sample diamond;

instructing an output loader to remove the sample diamond from the rotating plate and instructing an output sorter to place the sample diamond into a sorted bin for the evaluated color grade of the sample diamond, whereby sample diamonds are loaded and unloaded onto the rotating plate and color evaluated by comparison to master stones in the x,y color space.

* * * * *